US012349831B2

(12) United States Patent
White et al.

(10) Patent No.: US 12,349,831 B2
(45) Date of Patent: Jul. 8, 2025

(54) APPARATUS AND METHOD FOR FROTHING MILK

(71) Applicant: BREVILLE PTY LIMITED, Alexandria (AU)

(72) Inventors: Gerard Andrew White, Darlington (AU); Nicholas McColl, Randwick (AU); Daniel Robert Corkin, Panania (AU); Con Psarologos, Bardwell Valley (AU)

(73) Assignee: BREVILLE PTY LIMITED, Alexandria (AU)

( * ) Notice: Subject to any disclaimer, the term of this patent is extended or adjusted under 35 U.S.C. 154(b) by 393 days.

(21) Appl. No.: 17/347,584

(22) Filed: Jun. 14, 2021

(65) Prior Publication Data
US 2022/0133077 A1    May 5, 2022

Related U.S. Application Data

(63) Continuation of application No. 15/563,239, filed as application No. PCT/AU2016/000110 on Mar. 30, 2016, now abandoned.

(30) Foreign Application Priority Data

Mar. 30, 2015   (AU) ................ 2015901144
Mar. 4, 2016    (AU) ................ 2016900821

(51) Int. Cl.
*A47J 31/44*   (2006.01)
*A47J 31/56*   (2006.01)
*G01K 1/14*    (2021.01)

(52) U.S. Cl.
CPC .......... *A47J 31/4489* (2013.01); *A47J 31/56* (2013.01); *G01K 1/14* (2013.01); *A47J 31/44* (2013.01);

(Continued)

(58) Field of Classification Search
CPC ........ A47J 31/42; A47J 31/4489; A47J 27/56; A47J 31/4485; A47J 31/4496
See application file for complete search history.

(56) References Cited

U.S. PATENT DOCUMENTS 4,007,629 A     2/1977  Hochstein
5,943,472 A  *  8/1999  Charles ............... A47J 31/542
                                                    219/401

(Continued)

FOREIGN PATENT DOCUMENTS

CN          1488310 A     4/2004
CN        203506429 U     4/2014

(Continued)

OTHER PUBLICATIONS

Extended European Search Report for European Application No. 21210766.8 dated Jul. 8, 2022 (9 pages).

(Continued)

*Primary Examiner* — Steven W Crabb
*Assistant Examiner* — Alba T Rosario-Aponte
(74) *Attorney, Agent, or Firm* — Quarles & Brady LLP

(57) ABSTRACT

A temperature sensing assembly for a milk frothing apparatus. The assembly including: a temperature sensor element and a resilient support element that receives and biases the temperature sensor element towards thermal communication with the underside of a vessel; wherein the assembly is located towards the end of a protruding portion that extends from the body of the a milk frothing apparatus; and wherein an upper surface of the temperature sensor assembly is adapted to promote liquid movement into a drip tray reservoir. The apparatus may include: a steam source; an air source coupled to an air injector module for mixing the air and steam; a user interface for receiving input from a user; and wherein the apparatus is configurable by receiving input parameters through the user interface, whereby the param- (Continued)

eters includes final milk temperature, and an indication of froth amount.

8 Claims, 23 Drawing Sheets

(52) U.S. Cl.
CPC ...... *G01K 2207/06* (2013.01); *H05B 2213/07* (2013.01)

(56) References Cited

U.S. PATENT DOCUMENTS

| | | | |
|---|---|---|---|
| 8,939,308 B2 | 1/2015 | Ramsey et al. | |
| 2003/0232115 A1* | 12/2003 | Eckenhausen | A47J 31/461 426/477 |
| 2005/0005780 A1 | 1/2005 | Beretta | |
| 2007/0119308 A1 | 5/2007 | Glucksman et al. | |
| 2008/0181985 A1* | 7/2008 | Caswell | A23C 9/156 99/280 |
| 2010/0047407 A1* | 2/2010 | Carbonini | A47J 31/56 99/279 |
| 2011/0262606 A1* | 10/2011 | Blondel | A47J 27/004 426/474 |
| 2012/0297989 A1 | 11/2012 | Tonelli et al. | |
| 2013/0081545 A1 | 4/2013 | Thai | |
| 2013/0145936 A1* | 6/2013 | Dollner | A47J 31/4489 99/323.1 |
| 2014/0026759 A1 | 1/2014 | Etter et al. | |
| 2014/0069279 A1 | 3/2014 | Upston et al. | |
| 2014/0242224 A1 | 8/2014 | Glucksman et al. | |

FOREIGN PATENT DOCUMENTS

| | | |
|---|---|---|
| CN | 103874439 A | 6/2014 |
| CN | 103926970 A | 7/2014 |
| EP | 0422267 A1 | 4/1991 |
| EP | 2036471 A1 | 3/2009 |
| EP | 2389848 A1 | 11/2011 |
| EP | 2409611 A1 | 1/2012 |
| JP | 2013165814 A | 8/2013 |
| WO | WO-2011/048078 A3 | 10/2011 |
| WO | WO-2011/160818 A2 | 12/2011 |
| WO | WO-2012/151629 A1 | 11/2012 |
| WO | WO-2014/013833 A1 | 1/2014 |
| WO | 2014167452 A1 | 10/2014 |
| WO | WO-2014/165911 A2 | 10/2014 |
| WO | 2017048637 A1 | 3/2017 |

OTHER PUBLICATIONS

First Office Action issued in Chinese Patent Application No. CN 202110442422.4 dated Aug. 1, 2022 (10 pages).
International Search Report and Written Opinion for PCT/AU2016/000110, mailed May 25, 2016.
Extended European Search Report for European Patent Application No. 16771083.9, dated Dec. 7, 2018.
Examination Report for Australian Patent Application No. 2016240389, dated Apr. 6, 2018.
First Office Action issued in Chinese Patent Application No. 201680029284.4, dated Jun. 25, 2019.
Second Office Action issued in Chinese Patent Application No. 201680029284.4, dated Mar. 20, 2020.
Examination Report for Australian Patent Application No. 2019206066, dated Jan. 29, 2021.

\* cited by examiner

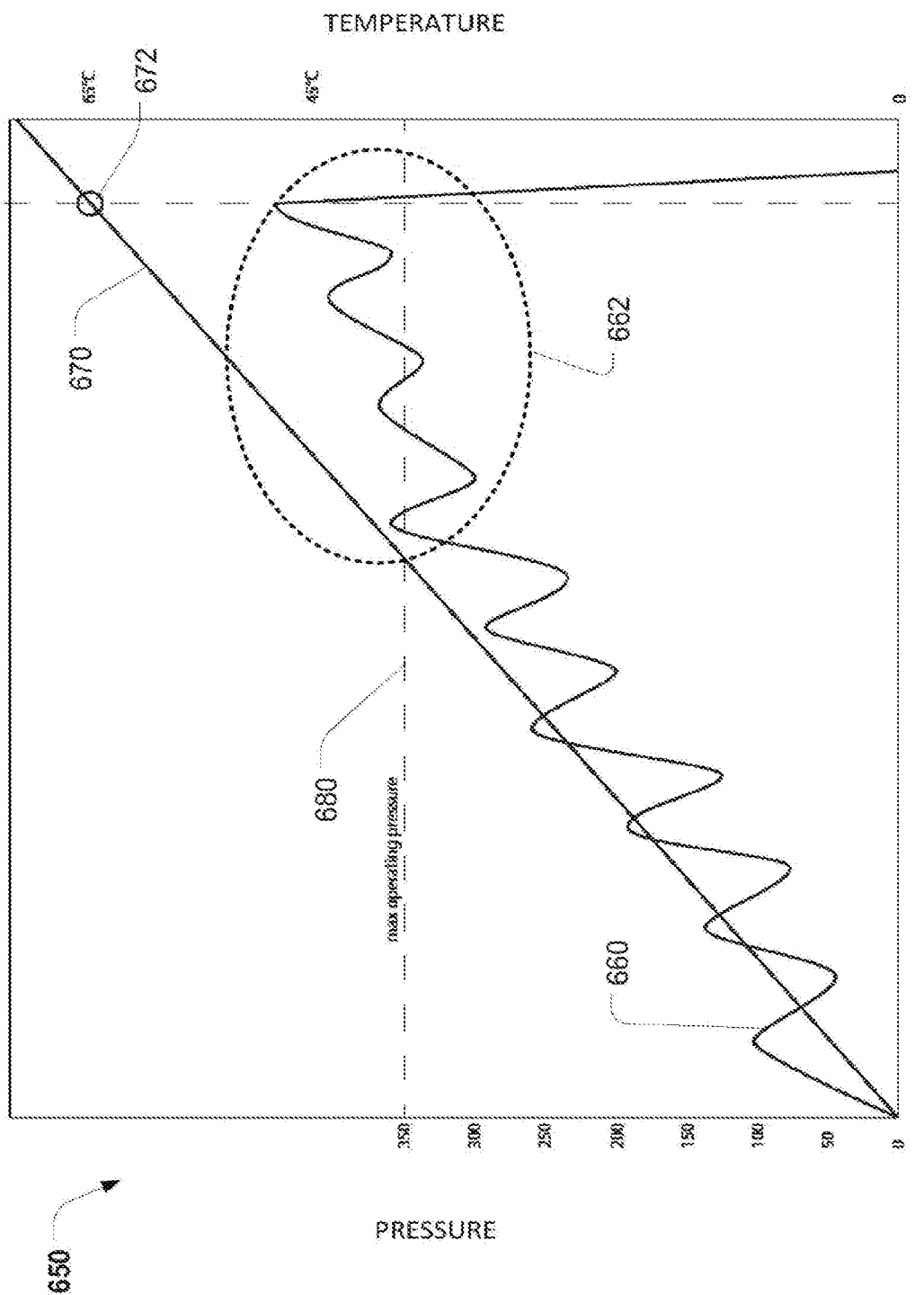

APPARATUS AND METHOD FOR FROTHING MILK

FIELD OF THE INVENTION

The invention relates to milk frothing and more particularly to methods and apparatus for milk frothing in an espresso making machine having a steam wand.

BACKGROUND OF THE INVENTION

Any discussion of the prior art throughout the specification should in no way be considered as an admission that such prior art is widely known or forms part of the common general knowledge in the field.

Steamed milk is used in the preparation of drinks such as latte, cappuccino and other hot beverages. When steamed milk is prepared in a jug, steam or a mixture of steam and air is generally introduced into the milk through a wand. However, the construction of a wand incorporating a temperature sensor such as a thermistor and also adapted to convey steam or a steam and air mixture is somewhat complicated and a system incorporating such a wand would benefit from simplification.

A steam wand has an end that is submersible into a container of milk. The wand injects steam or a mixture of steam and air into the milk. The end product is a milk froth. A milk froth has a target temperature and froth texture. Different milk froth textures are required for different beverages. Texture refers to the air content and bubble size distribution in a froth. Achieving the correct temperature and texture in the finished froth product requires either a skilled operator or a frothing device that is at least partially automated. The content of the Applicant's PCT patent application, WIPO publication numbers WO 2012/151629 is incorporated herein by reference.

SUMMARY OF THE INVENTION

According to an aspect of the technology there is provided an apparatus for milk frothing.

According to an aspect of the technology there is provided a coffee making and/or milk frothing apparatus that includes: a steam source and an air source coupled to an air injector module for mixing the air and steam.

According to an aspect of the technology there is provided an espresso making machine including a frothing apparatus as disclosed herein.

The milk frothing apparatus may be user configurable by receiving input parameters through a user input. The parameters may include final milk temperature, indication of milk type and/or indication of froth amount. The indication of milk type may include typical example milk types for user selection. The indication of froth amount may be represented by a scale (e.g. enumerated) for user selection.

According to an aspect of the technology there is provided an apparatus for milk frother, the apparatus including:
a steam path for providing heated steam to heat the milk;
an air path including an air pump;
an air injection module for guiding air from the air path into the steam path, resulting in an air steam mixture;
a steam output to provide egress of the air steam mixture for heating the milk;
a plurality of sensors, including a milk temperature sensor and a steam/air path pressure sensor; and
a controller in communication with memory storing operating and frothing parameters, the controller adapted to: receive the operating parameters and sensed signals from the plurality of sensors; calculate a pressure set point from the operating parameters and signals; and provide control signals for controlling the operation of the steam path and the air path to froth the milk according to the operating parameters.

The milk frother may further include a user interface for receiving one or more of the frothing parameters from a user input. The frothing parameters may include final milk temperature, milk type and/or froth amount.

Frothing parameters indicative of different milk types may specify different milk consistencies and/or a range of milk ingredients (e.g. fat or additive contents) and/or commercial milk varieties. The milk type frothing parameter enables retrieving associated operating parameters for frothing the specified milk type to a specified consistency.

Frothing parameters indicative of different froth amounts may be indicative of a selected froth consistency. This input froth amount parameter enables retrieving an associated operating parameter for frothing milk to a specified froth consistency. This input froth amount parameter may be used with the input milk type parameter to enable retrieving an operating parameter for frothing the specified milk type to the specified froth consistency.

The controller may further be adapted to log the sensed pressure signal over time during the frothing process, and to determine whether the sensed pressure signal exceeds a maximum pressure threshold.

The controller may further be adapted to log the control signal to the air pump in the air path, and to determine whether the air pump power exceeds a maximum air pump power threshold.

The controller may further be adapted to provide a signal indicative of a blocked steam wand to the user interface for display, and also a signal indicative of a likely cause of the blocked steam wand based on whether the maximum pressure threshold and/or the maximum pump power threshold have been exceeded.

According to an aspect of the technology there is provided an espresso making machine including a means or method of testing if the steam wand is blocked, as disclosed herein.

According to an aspect of the technology there is provided a method of frothing milk as disclosed herein.

The method of frothing milk may include the step of receiving input parameters through a user input for enabling user configurability. The parameters may include final milk temperature, indication of milk type and/or indication of froth amount. The indication of milk type may include typical example milk types for user selection. The indication of froth amount may be represented by a scale (e.g. enumerated) for user selection.

A method for frothing milk including the steps of
receiving user input parameters, including a final milk temperature, a froth amount and a milk type;
receiving an intermediate temperature threshold and an air pressure offset based on the user parameters;
heating milk to the intermediate temperature while applying the air pressure offset to an air pump;
reducing the pump power, or switching off the air pump power off, and heating the milk to the final temperature.

The method may further include monitoring the air pressure in a steam wand as well as monitoring the air pump power. The method may further include determining whether the air pressure exceeds a maximum air pressure threshold and/or whether the air pump power exceeds a maximum power threshold.

The method may further include determining a likely cause of steam wand blockage based on whether the maximum air pressure threshold and/or the maximum power threshold have been exceeded, and providing a related indication on a user interface. According to an aspect of the technology there is provided an espresso making machine and/or milk frothing including a drip tray and/or temperature sensor as disclosed herein.

According to an aspect of the technology there is provided a milk frothing apparatus, the apparatus including:
  a steam source;
  an air source coupled to an air injector module for mixing the air and steam;
  a user interface for receiving input from a user; and
  wherein the apparatus is configurable by receiving input parameters through the user interface, whereby the parameters includes final milk temperature, and an indication of froth amount.

The indication of froth amount may be represented in the user interface by a scale for user selection. The input parameter may further includes milk type.

The apparatus may further include:
  a steam path for providing heated steam to heat the milk;
  an air path including an air pump;
  the air injection module for guiding air from the air path into the steam path, resulting in an air steam mixture;
  a steam output to provide egress of the air steam mixture for heating the milk;
  a plurality of sensors, including a milk temperature sensor and a steam and/or air path pressure sensor; and
  a controller in communication with memory storing operating and frothing parameters, the controller adapted to: receive the operating parameters and sensed signals from the plurality of sensors; calculate a pressure set point from the operating parameters and signals; and provide control signals for controlling the operation of the steam path and the air path to froth the milk according to the operating parameters.

An input froth consistency parameter may be used with an input milk type parameter to enable retrieving an operating parameter for frothing the specified milk type to the specified froth consistency.

The controller may be adapted to log the sensed pressure signal over time during the frothing process, and to determine whether the sensed pressure signal exceeds a maximum pressure threshold.

The controller may be adapted to log the control signal to the air pump in the air path, and to determine whether the air pump power exceeds a maximum air pump power threshold.

The controller may be adapted to provide a signal indicative of a blocked steam wand to the user interface for display, and also a signal indicative of a likely cause of the blocked steam wand based on whether a maximum pressure threshold and/or a maximum pump power threshold have been exceeded.

According to an aspect of the technology there is provided a method for frothing milk including the steps of:
  receiving user input parameters, including a final milk temperature, a froth amount and a milk type;
  receiving an intermediate temperature threshold and an air pressure offset based on the user parameters;
  heating milk to the intermediate temperature while applying the air pressure offset to an air pump;
  reducing the pump power, or switching off the air pump power off, and heating the milk to the final temperature.

The method may further include the step of: monitoring the air pressure in a steam wand as well as monitoring the air pump power. The method may further include the step of: determining whether the air pressure exceeds a maximum air pressure threshold and/or whether the air pump power exceeds a maximum power threshold. The method may further include the step of: determining a likely cause of steam wand blockage based on whether the maximum air pressure threshold and/or the maximum power threshold have been exceeded, and providing a related indication on a user interface. The method may further include the step of: providing a milk frothing apparatus as herein described.

According to an aspect of the technology there is provided a temperature sensing assembly for a milk frothing apparatus, the assembly including:
  a temperature sensor element and a resilient support element that receives and biases the temperature sensor element towards thermal communication with the underside of a vessel;
  wherein the assembly is located towards the end of a protruding portion that extends from the body of the a milk frothing apparatus; and
  wherein an upper surface of the temperature sensor assembly is adapted to promote liquid movement into a drip tray reservoir.

The support may form a seal between protruding portion and the upper surface defined by a separate element.

The upper surface element may have an aperture, such that the resilient support element forms a seal for limiting ingress of fluid through the aperture.

The resilient support element may be held in compression between the protruding portion of the body or chassis and the upper surface element for creating a water tight seal.

The upper surface element may be coupled to the protruding portion by one or more press clips extending from the underside the upper surface element that engage cooperating recesses in the protruding portion.

A shoulder of the protruding portion may support the resilient support element, such that resilient support element is captured and abutting held by the protruding portion and the upper surface element.

The protruding portion may have an aperture for receiving the temperature sensor, which is covered by the resilient support element.

The temperature sensor element may be retained within the resilient support element, and a U clip may engage both the temperature sensor element and the resilient support element. The U clip may prevent the temperature sensor element from being pulled upward, and prevents the temperature sensor element being deflected too far downward due to it engaging the chassis.

A rib of the milk frothing apparatus may limit downward deflection of the temperature sensor element.

A sleeve defined by the protruding portion may capture the downwardly extending outer wall of the resilient support element.

A void space below the resilient support element may allow downward travel of the resilient support element.

The temperature sensor element may be thermally coupled to the vessel, wherein the temperature sensor element is further coupled to a processor module that receives a temperature signal and controls a steam generation module for generating steam delivered to the vessel.

The assembly may include a milk frothing apparatus as herein described.

BRIEF DESCRIPTION OF THE DRAWINGS

A preferred embodiment of the invention will now be described, by way of example only, with reference to the accompanying drawings in which:

FIG. 6B is a graph depicting the measured air pressure and measured temperature during a milk frothing cycle, showing typical results for an apparatus with a blocked steam wand;

PREFERRED EMBODIMENT OF THE INVENTION

Figure 1:
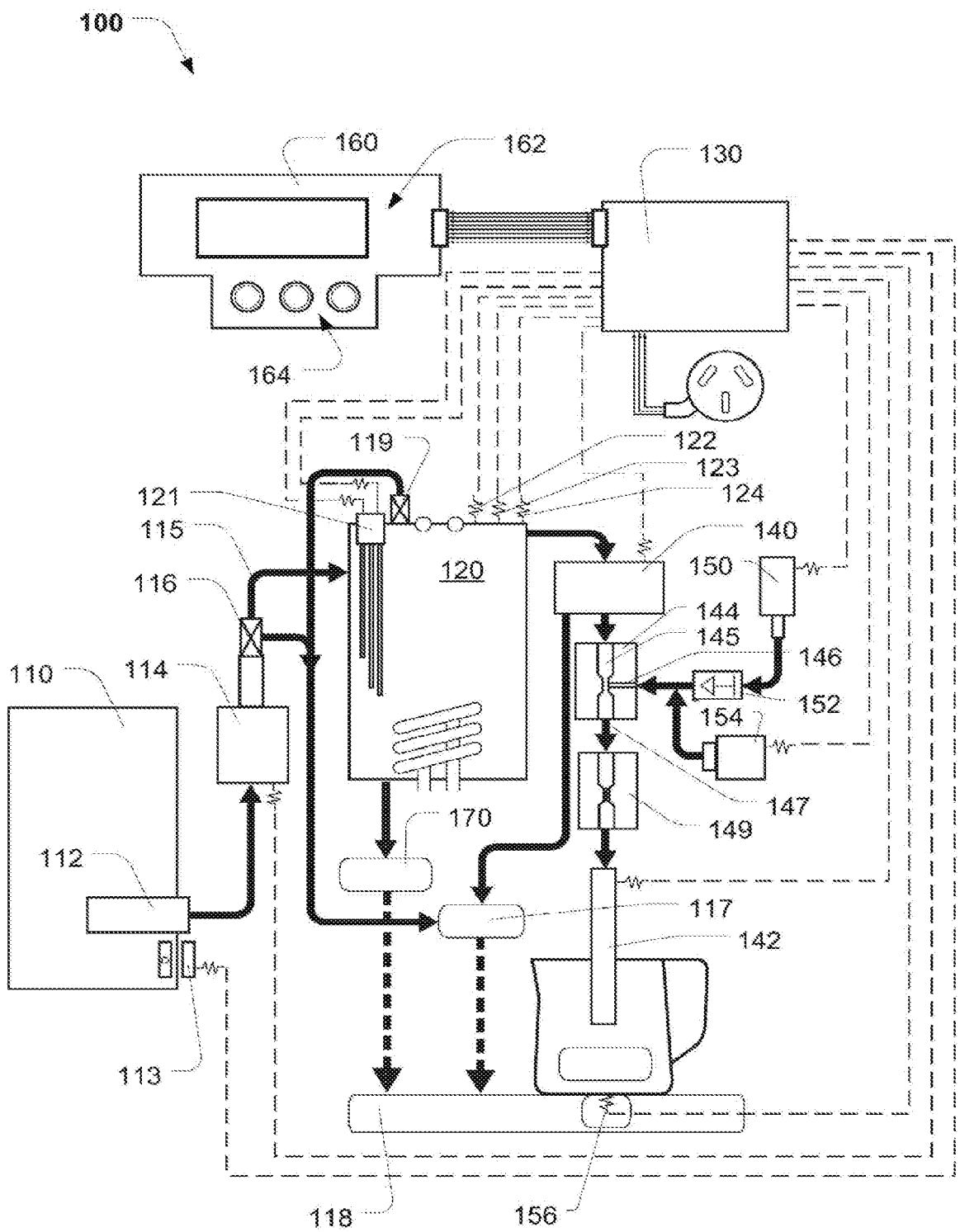
FIG. 1 is a schematic diagram of an embodiment espresso making machine.

Apparatus and methods for improved milk frothing have been described in PCI patent application PCT/AU2014/000947, published as WO/2015/042652. The content of this PCT patent publication WO/2015/042652 is incorporated herein by reference.

Milk Frothing Apparatus with Controlled Airflow

In existing automatic milk froth systems it is difficult to achieve a high quality frothed milk consistency and reliability. Cleaning is an issue with existing temperature sensor construction within the tip of the steam wand.

In an example embodiment air flow from a precisely controlled source of pressurized air can be combined with the steam path allowing adjustable frothing and texturing of milk. A steam and air mixture is output through the steam wand that is submersible in a milk jug. A heating and frothing cycle may be dependent on temperature feedback of the milk as measured by a temperature sensor (for example in the base of the jug or in the base of the frothing apparatus itself). A user can select or program profiles for different types of milk (i.e. full fat, skim, soy, UHT etc.). The resulting steam/air mix is then combined with milk in a jug through the submersible steam wand. Addition of air cycle stages are dependent on the feedback from, for example, a milk jug temperature sensor because, as described elsewhere herein, air is added during the frothing process until the milk reaches an intermediate temperature.

In some embodiments, a cleaning purge cycle is selectively and/or automatically initiated. A cleaning steam pulse can be applied when the steam wand is returned to a home position (e.g. automatically using a spring loaded and dampened mechanism). Cleaning can be automated using the biased steam wand and a cleaning steam pulse. Sensor feedback of the wand position and/or previous cycle data may also be used as input data to the cleaning process (i.e. cleaning may not be required if the milk is not heated).

In an embodiment, the frothing apparatus has a source of steam, a source of pressurized air, one or more air pressure sensors associated with ports on a mixing component (i.e. a venturi, an ejector or a T-junction component), and a control module coupled to the air pressure sensor for controlling the air source such that air pressure applied to the mixing device is sufficient to provide a pressure differential. The controlled pressure differential allows for a variable airflow into the steam path. A temperature sensor for measuring temperature of the milk in a jug (e.g. associated with base of the frothing jug) can be coupled to the control module to enable adjustments to the steam source and air source as described elsewhere herein.

In some embodiments the control module receives sensor signals that measure operating conditions, and calculates parameters for controlling the air source and/or the steam source accordingly. Controlled components such as the steam source and air pressure can be continuously adjusted throughout the steam cycle using a control logic loop.

It will be appreciated that an embodiment can, by way of example only, provide one or more of the following advantages:

providing a more precise control of air injection into steam path allowing for improved milk froth quality;

providing automatic adjustment of air pump parameters to compensate for changes to operating conditions (i.e. steam flow, boiler pressure, air pump pulses, and wand back pressure);

providing an ability to use different control profiles based on milk type. (i.e. soy, skim milk, full fat, etc.) This can be achieved by tuning operating parameters which can affect the end result of milk type products enabling lower cost of configuration by using a small pump when compared to existing competing systems.

Figure 2:
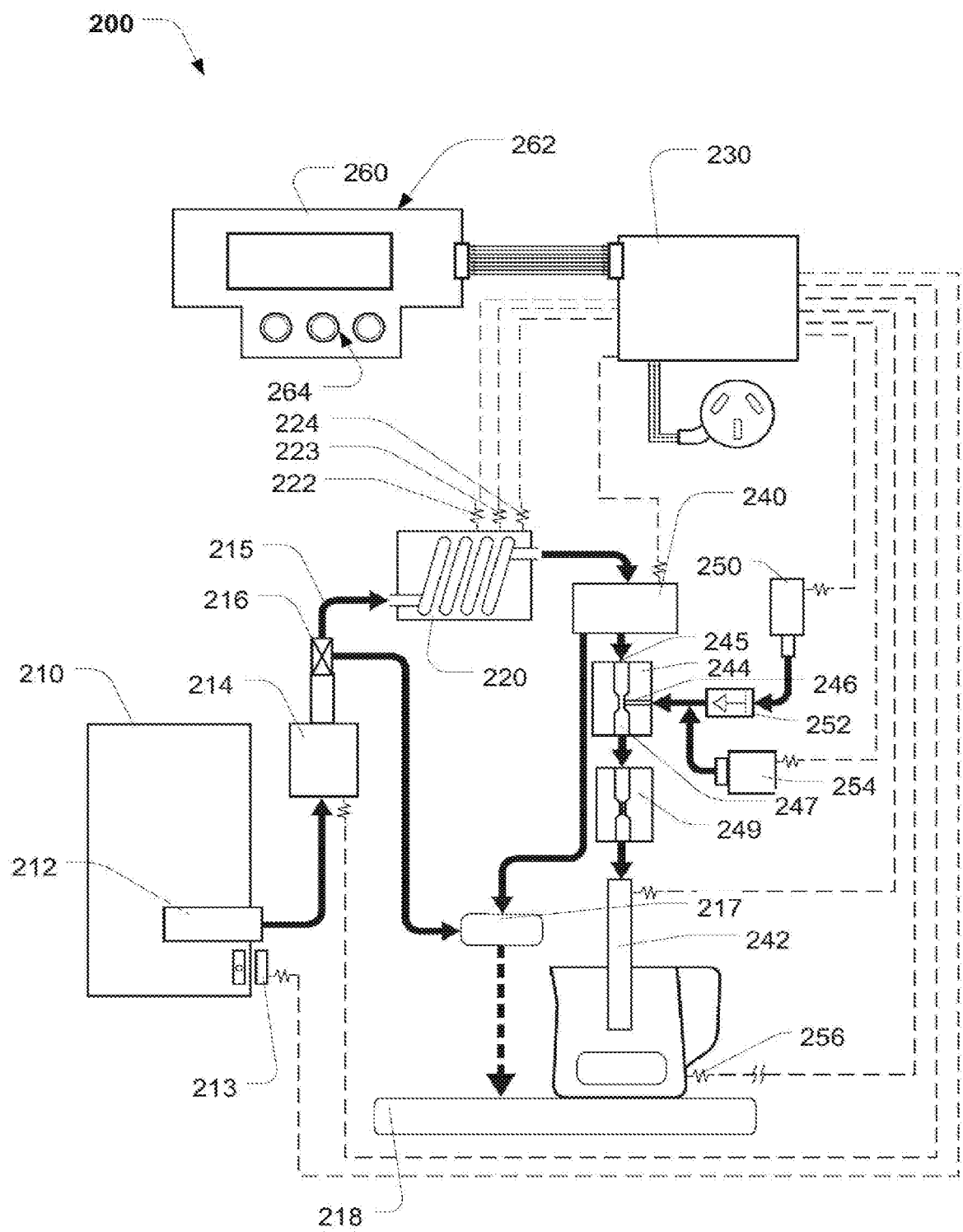
FIG. 2 is a schematic diagram of another embodiment espresso making machine.

FIG. 1 and FIG. 2 show example plumbing and control schematics for example embodiments.

Referring to FIG. 1, an example espresso making machine 100 includes a boiler 120, pressure transducer 154 and milk temperature sensor 156 (e.g. using a negative temperature coefficient "NTC" sensor element) associated with base of the espresso making machine 100.

This example embodiment apparatus 100 includes a water source 110 for providing water, typically through a filter cartridge 112, which is conveyed by a pump 114 to a boiler 120. The flow line 115 leading to the boiler has an overpressure valve 116 that leads to an overflow path 117 to the drip tray 118. The boiler also has a vacuum breather valve 119 that is in fluid flow communication with the drip tray.

A processor module 130 monitors operation of the boiler 120 through a level sensor 121 and/or a pressure sensor 122 (for example a Piezoresistive strain gauge pressure transducer) and/or a thermal fuse 123 and/or a thermostat 124. The water tank 110 can further include a water level sensor 113, coupled to the processor module 130, for monitoring water availability.

A solenoid 140 controls release of steam flow to a steam wand 142 via an air injector module 144 and an optional static mixer 149. The air injector module includes a primary steam flow path 145, an air injection path 146 and an outflow 147. By way of example, the air injection module can incorporate a venturi. The air injection flow path 146 can receive pressured air delivered by an air pump 150 typically through a one way valve 152. A pressure sensor 154 is coupled to the air ingress flow path 146. The pressure sensor 154 provides pressure measurements to the processor module 130.

It will be appreciated that with the air pump 15o turned off (disabled), the pressure sensor can monitor a base level pressure provided by the injection module caused by the steam air flow and any back pressure provided by the steam wand. With the air pump 150 activated to varying power levels (0%-100%) the pressure sensor monitors the pressure in the air ingress flow path, allowing for control of the pump.

It would be further appreciated that, with the air pump activated (power could be from 0%-100%), if the measured pressure is greater than the background pressure measured with the air pump off, then air will be injected into the steam flow path, then mixed and delivered to the steam wand.

A temperature sensor 156 monitors the temperature of the milk, and provides a temperature signal to the process module 130.

The processor module 130 is coupled to a user interface 160 comprising a display element 162 and a plurality of user input elements 164.

In an embodiment, a descale valve 170 can enable direct flow from the boiler to the drip tray.

In some embodiments the frothing apparatus as described herein is not necessarily associated with or integral with an espresso making machine.

Referring to FIG. 2, an example frothing apparatus 200 includes a heating element transducer system 222, 223, 224, pressure transducer 254 and milk temperature sensor 256 (NTC) associated with a jug. FIG. 2 shows an embodiment using a flow through steam element 220 (e.g. a thermoblock) in place of the steam boiler of the embodiment 100. The temperature sensor can be removable from the jug as described in more detail elsewhere herein.

The frothing apparatus 200 includes a water source 210 for providing water, optionally through a filter cartridge 212, which is conveyed by a pump 214 to a steam element 220.

The flow line 215 leading to the steam element has an overpressure value 216 that leads to an overflow path 217 to the drip tray 218.

A processor module 230 monitors operation of the steam element 220 through a pressure sensor (e.g. a Piezoresistive strain gauge pressure transducer) (not shown), and/or a temperature sensor 222 (for example an NTC thermistor) and/or a thermal fuse 223 and/or a thermostat 224. The water tank 210 can further include a water level sensor 213, coupled to the processor module 230, for monitoring water availability.

A solenoid 240 controls release of steam flow to a steam wand 242 via an air injector module 244 and an optional static mixer 249. The static mixer can allow for further combining of the steam fluid, making it more homogenous. The air injector module includes a primary steam flow path 245, an air injection path 246 and an outflow 247. By way of example, the air injection module can incorporate a venturi. The air injection flow path 246 can receive pressured air delivered by an air pump 250 typically through a one way valve 252. A pressure sensor 254 is coupled to the air ingress flow path 246. The pressure sensor 254 provides pressure measurements to the processor module 230.

It will be appreciated that with the air pump turned off (disabled), the pressure sensor can monitor a base level pressure provided by the injection module caused by the steam air flow and any back pressure provided by the steam wand. With the air pump actuated (enabled), the pressure sensor monitors the pressure in the air ingress flow path.

It would be further appreciated that, with the air pump enabled, if the measured pressure is greater than the background pressure measured with the air pump off, then air will be injected into the steam flow path, then mixed and delivered to the steam wand.

In this example embodiment, a temperature sensor 256, associated with the jug, monitors the temperature of the milk and provides a temperature signal to the process module 230.

The processor module 230 is coupled to a user interface 260 comprising a display element 262 and a plurality of user input elements 264.

FIG. 3 shows an embodiment flow chart 300 for a method performed by a processor module for providing and monitoring production of frothing milk.

In commencing the method 300 the user may specify a milk type, typically by selection from a list including a plurality of known milk types, for example as selected from the set comprising Full-Cream, Skim-Milk (low-fat), Soy Milk and UHT.

In commencing the method 300 the user may specify a milk froth or foam volume, typically by selection from a list including a plurality of predefined values indicative of a respective froth or foam volume, for example as selected from a range from low to high.

In commencing the method 300 the user may specify a final milk temperature. Alternatively, the final milk temperature may be preconfigured and/or adjustable (either per use or stored).

The method 300 may use the selected milk type and froth/foam volume to configure the apparatus. By way of an example only, Table 1 shows a matrix that is indexed by milk type and froth/foam volume. The matrix may be used to retrieve parameters used in the method, as discussed below. For example, a user selected milk type of skim-milk with the froth/foam volume of 4 would indicate parameters for the method being an offset pressure of 35 units and an intermediate stage temperature of 45 Deg C.

The terms "intermediate stage" and "stage 2" are used interchangeably when referred to the method described herein.

TABLE 1

| | Milk Froth/Foam Volume | | | | | |
|---|---|---|---|---|---|---|
| | 1 | 2 | 3 | 4 | 5 | 6 |
| Milk Type Full-Cream | 40Deg C./ Ø Pres-Offset | 40Deg C./ 5 Pres-Offset | 40Deg C./ 15 Pres-Offset | 40Deg C./ 35 Pres-Offset | 45Deg C./ 60 Pres-Offset | 45Deg C./ 100 Pres-Offset |
| Skim-Milk (low-fat) | 45Deg C./ Ø Pres-Offset | 45Deg C./ 10 Pres-Offset | 45Deg C./ 20 Pres-Offset | 45Deg C./ 35 Pres-Offset | 45Deg C./ 60 Pres-Offset | 45Deg C./ 100 Pres-Offset |
| Soy Milk | 45Deg C./ Ø Pres-Offset | 45Deg C./ 5 Pres-Offset | 45Deg C./ 10 Pres-Offset | 45 Deg C./ 25 Pres-Offset | 45Deg C./ 50 Pres-Offset | 45Deg C./ 80 Pres-Offset |
| UHT | 45Deg C./ Ø Pres-Offset | 45Deg C./ 10 Pres-Offset | 45Deg C./ 20 Pres-Offset | 45Deg C./ 35 Pres-Offset | 45Deg C./ 60 Pres-Offset | 45Deg C./ 100 Pres-Offset |

Figure 3A:
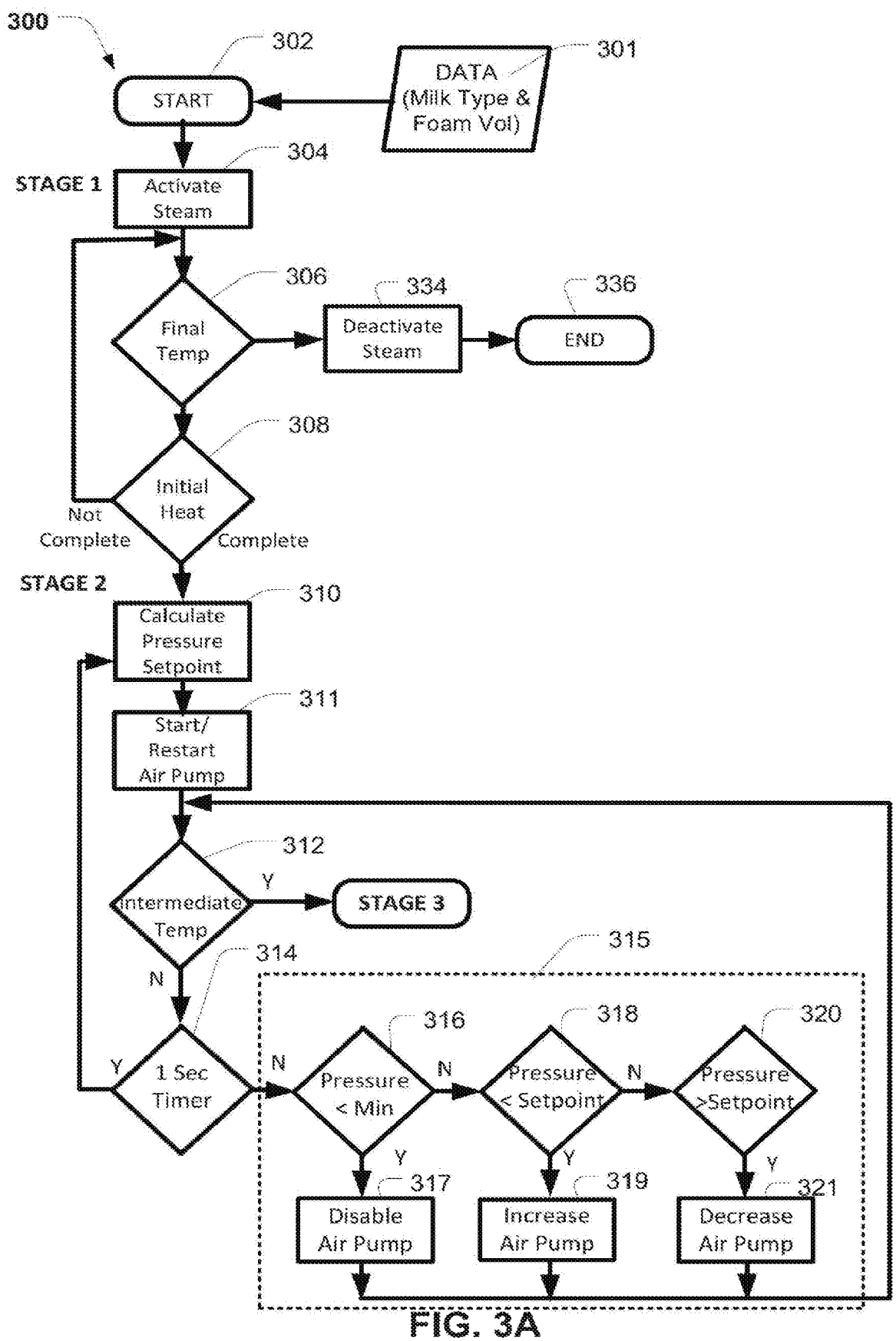
FIG. 3A and FIG. 3B are flow charts for an embodiment method of frothing milk.
Figure 3B:
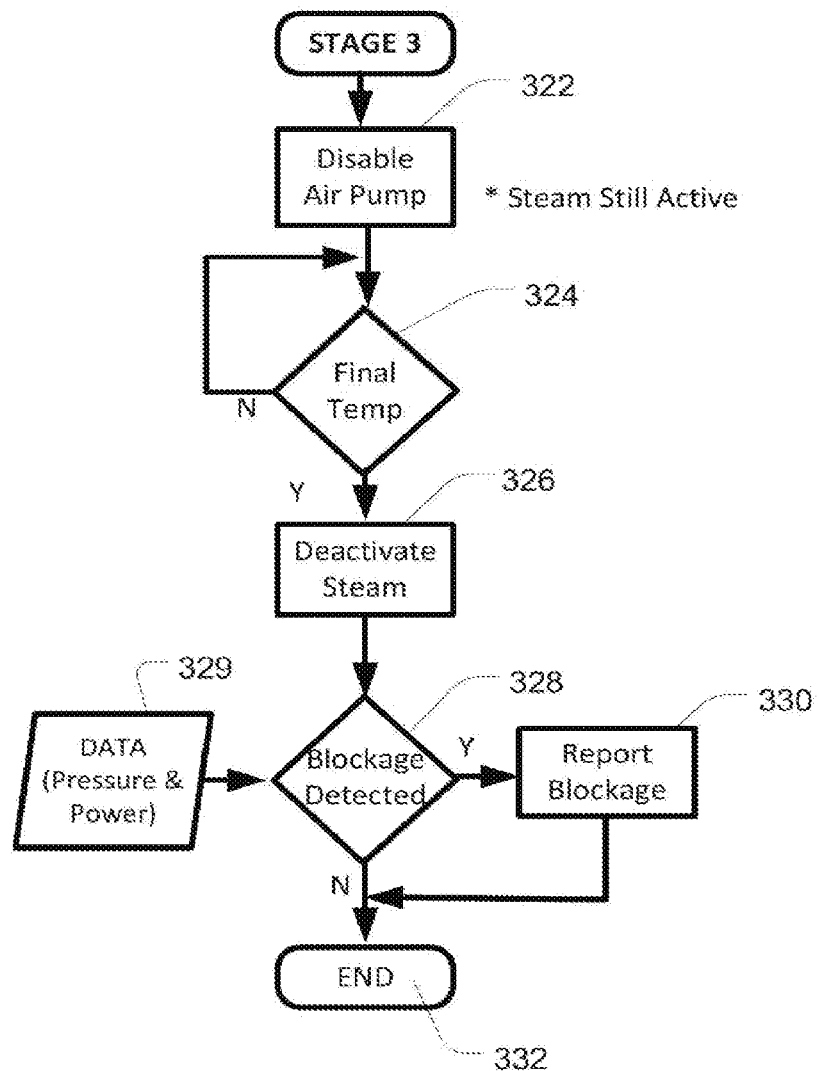

FIG. 3A and FIG. 3B show, by way of example only, the method 300 includes any one or more of the following steps:

STEP 302: Starts by receiving user input for activating auto froth cycle (at 301), and proceed to STEP 304.

STAGE 1—which is a preparation step where the method checks that the milk is not already at the final temperature, and if not then heating commences for a short initial period without the addition of air.

STEP 304: activate the steam flow to the wand, present status to the user display; this commences the first heating stage for a first time period (for example an initial 2 seconds) using only steam; proceed to STEP 306.

STEP 306: compare measured milk temperature with a first predetermined or threshold temperature (e.g. 60/65 degrees Celsius, which is typically the final milk temperature), if measured milk temperature is less than the threshold temperature then proceed to STEP 308, otherwise proceed to STEP 334 where the steam is deactivated and the frothing process ends.

STEP 308: if a "no-air" timer has exceeded a first predetermined time period (e.g. 2 seconds) proceed to STEP 310, otherwise proceed to STEP 306; this enables the first stage to continue for the first predetermined time period, assuming the threshold temperature is not reached.

STAGE 2, which is a frothing stage wherein air is added to the steam path in order to add air into the milk for frothing. Stage 2 ends when the intermediate temperature is reached, as shown in Table 1.

STEP 310: Commencing STAGE 2, calculate a pressure set point; for example, requires the air pump to be disabled, measure the air pressure using a pressure transducer (e.g. pressure sensor 154 or 254) resulting in a base-line pressure measured in some units (need not be calibrated); for example a pressure set point may be calculated by combining the base-line air pressure+an offset pressure in the same units based on a user selected milk type and froth/foam volume using the above table; for example a pressure set point may also add a further offset based on a rate of change of pressure calculation as discussed below; proceed to STEP 311.

STEP 311: enable air pump (for example at or above 50%); proceed to STEP 312;

STEP 312: if measured milk temperature is less than a predetermined or user selected intermediate stage temperature threshold (e.g. 40/45 degrees Celsius) proceed to STEP 314, otherwise proceed to STEP 322; this enables the second stage to continue until an intermediate stage temperature threshold is reached.

STEP 314: if the air pump timer has exceeded a second predetermined time (e.g. 1 seconds) proceed to STEP 310 (enabling for re-measurement of baseline pressure, and subsequent calculation of next pressure set point), otherwise proceed to STEP 316 and control the air pump pressure to achieve the pressure set point.

STEP 316: if measured air pressure is less than a minimum threshold (e.g. 5 psi) disable the air pump (at 317) and proceed to STEP 312, otherwise proceed to STEP 318. This is a safety step, to ensure that the frother is functioning normally and that the pressure is not below normal operational values.

STEP 318 if the measured air pressure is less than the set point increase the air pump power (at 319) and proceed to STEP 312, otherwise proceed to STEP 320.

STEP 320: if the measured air pressure is greater than the set point decrease the air pump power (at 321) and proceed to STEP 312, otherwise proceed to STEP 312.

STAGE 3, wherein the milk is heated further to the final temperature as set by the user (or a default final temperature), without the further addition of air for frothing.

STEP 322: disable the air pump, proceed to STEP 324; the steam remains active to continue heating;

STEP 324: if the milk temperature is greater than a target temperature (e.g. 60/65 degrees Celsius) proceed to STEP 326, otherwise wait at STEP 324 until milk temperature is greater than the target temperature;

STEP 326: deactivate the steam flow, present the status to the user display, and proceed to STEP 328;

STEP 328: receiving measured or calculated data regarding air pressure and pump power (at 329); enabling detection of operation parameters for concluding if there is a restriction in the steam tip or wand, which degrades the performance and consistency of system; if a blockage is determined proceed to STEP 330, otherwise proceed to STEP 332; by way of example, if the air pressure profile required was greater than a pre-determined maximum (blockage) threshold pressure blockage may be detected and/or if the air pump power profile required was greater than a pre-determined maximum (blockage) threshold power blockage may be detected.

STEP 330: present status to user indicating the steam wand may be blocked and proceed to STEP 332. In addition, the status information may provide details about a likely source of the steam wand blockage as described elsewhere herein.

STEP 332: complete the auto froth cycle.

It will be appreciated that in this embodiment flow chart 300, each temperature and timer value is provided by way of example only and may be adjustable and/or calculated by a processor module and/or have different pre-determined values. As the process provides ongoing monitoring of the temperature and pressure provided by the steam wand, the user can adjust a set temperature and/or froth settings and/or milk type at any time during the cycle. The user can also stop a cycle at any point.

It would also be appreciated that during a froth cycle, the air pressure control loop may cause the air pressure set point to increase over time using a rate change calculation that provides an estimate/prediction for the air pressure set point during the pump time cycle based on previous air pressure readings.

It would also be appreciated that steps 316, 317, 318, 319, 320, 321 operate as a feedback control 315. The feedback control 315 of pressure can the implemented using any conventional or known feedback methods including, but not limited to, On-Off Control, Proportional Control, Proportional-Derivative Control, Proportional-Integral Control, Proportional-Integral-Derivative Control (PID control), and Third-Order Control Systems.

Referring to step 328, determining if a blockage has occurred may include identifying if the air pressure profile required was greater than a pre-determined maximum (blockage) threshold pressure, and/or blockage may be detected if the air pump power profile required was greater than a pre-determined maximum (blockage) threshold power. It will be appreciated that:

(a) if the pressure is increasing beyond a threshold pressure due to the boiler steam generated, there may be a blockage; and/or
(b) if the air pump power required during the second stage is at or near the capacity of the pump (noting the set point is above the measured base-line pressure), there may be a blockage.

By monitoring both air pump power and base-line pressure, if the air pump power required during the second stage is at or near the capacity of the pump, and the pressure is not beyond a threshold pressure, there may be a fault in the air pump.

Monitoring blockages and air pump condition will be discussed further bellow.

In controlling the air pump, a certain background or base-line pressure exists in the steam path due to the steam used for heating the milk. This is measured by the pressure sensor 154, 254. The behaviour of the background pressure (or steam pressure) can be predicted by measuring the pressure at sample time instance $t_n$ (i.e. $P_n$), and calculating a rate of change of pressure (i.e. $\Delta P/\Delta t$ or $\Delta P_n$) over time using past values of pressure using conventional methods of averaging or modelling. This makes it possible to predict pressure at a subsequent time instance (i.e. $P'_{n+1}$), for example $P'_{n+1}=P_n+\Delta P_n$.

Measuring and characterising the background or base line pressure is important because the air pump set point (i.e. $P_{set}$), for adding air pressure into the steam path (i.e. $P_{offset}$) relies on the background pressure (as measured or estimated). In particular, $P_{set}=P'_{n+1}+P_{offset}$. Alternatively $P_{set}=P_n+P_{offset}$ without using prediction.

It will be appreciated that $P_n$ can be further modelled or averaged to remove measurement artefacts.

The pressure offset value provided in the above table can be used as $P_{offset}$. In other words, to froth the milk "a bit more air" is required in the steam path (in addition to the pressure already resulting from the steam that heats the milk). So the "bit more air" is an offset amount as provided in the table.

In the method above, the air pump is turned on to a predetermined amount required to turn the pump on (e.g. 50%) following every time a pressure measurement is made (during which the pump is turned off). The pressure measurement can be taken periodically (e.g. every 1 or 2 seconds). Once the air pump has been switched on to a predetermined amount to ensure starting, the pump is controlled by going through the feedback control loop shown in the flow diagram to increase/decrease the pump power by 1% to reach the set point $P_{set}$. The control loop operates to cause the pressure to reach the set point promptly.

If the control loop determines the pressure is too low, this can indicate a malfunctioning steam path from the boiler to the wand, at which time the air pump is not activated to improve safety. Refer to step 316 in FIG. 3A.

Figure 4A:
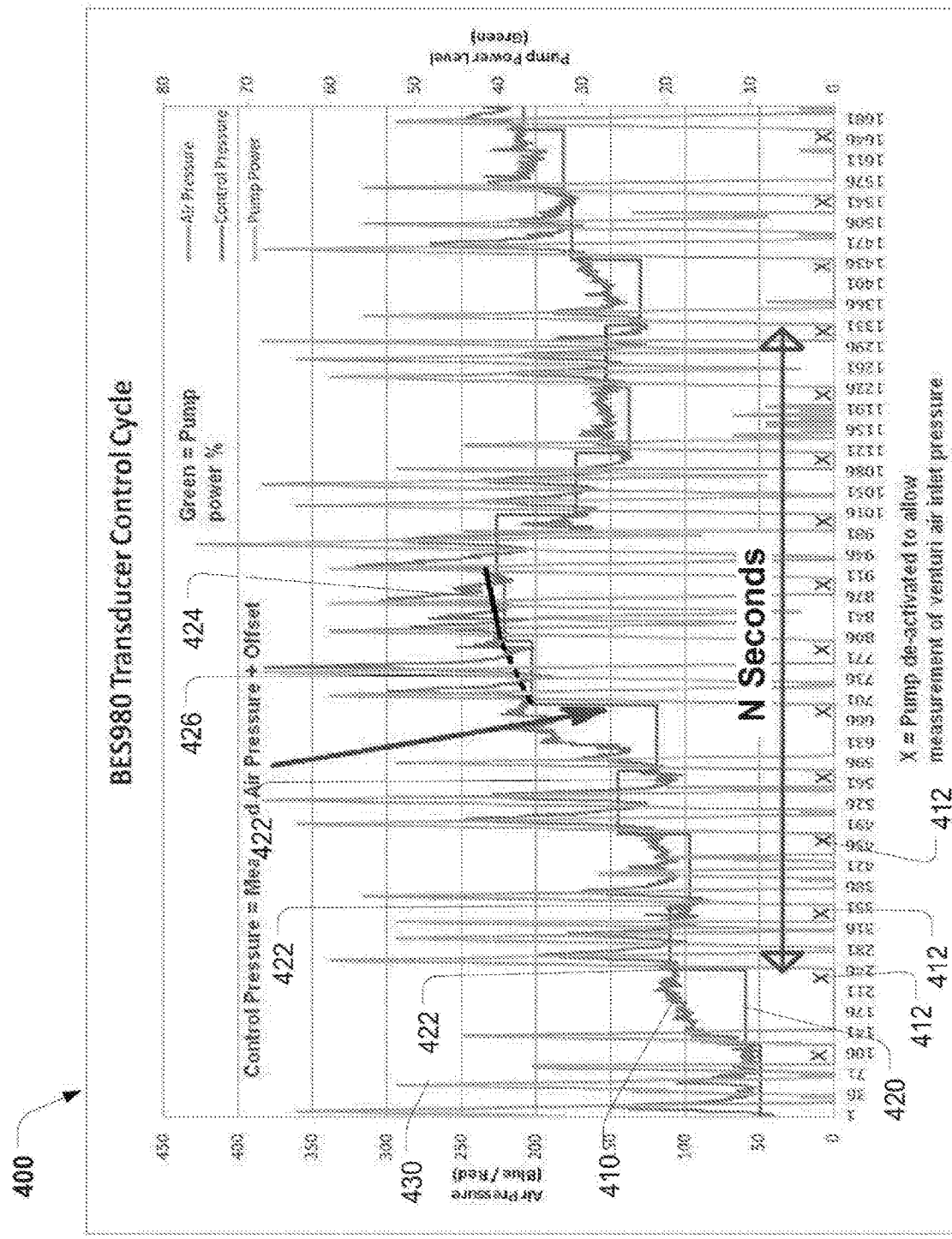
FIG. 4A is a graph depicting a portion of control cycles of an embodiment method according to FIG. 3.

FIG. 4A is an example graph 400 that shows pressure measurements during a portion of a froth cycle.

The graph 400 shows a line 410 that depicts measured air pressure, and a line 420 that depicts a pressure controlled set point over time. This is overlaid with line 430 that depicts the pump power over time.

It will be appreciated that the line 420, in this example, is piece-wise linear or stepped-continuous for providing a controlled pressure set point.

In this example, the air pump is disabled periodically (for example tx seconds at 412, where tx ranges between 0.5 and 3 seconds), to enable the pressure transducer to measure a base pressure. After measuring a base pressure, an offset is applied to provide a control pressure set point for the sample time period (at 422), allowing the control loop to control the air pump to provide pressure measured at the pressure transducer that is about the control pressure set point.

It would be observed from the graph 400, that the base pressure changes over time, for example due to back pressure provided by the milk during the process, the boiler pressure, and any blockages in the steam wand. By periodically monitoring the background pressure, and reapplying and/or calculating an appropriate offset pressure, the air pump can be controlled to counteract any fluctuations in background pressure and thereby provide a more reliable mix ratio between the steam flow and air flow. It would be appreciated that the graph 400 depicts a stepwise approximation for the control pressure set point, which can be changed to a linear prediction.

In an alternative embodiment, by way of example only, the pressure control set value can also vary over time during (or within) a sample period by modelling or predicting a base pressure during that sample period (based on past samples). It will be appreciated that an interpolation (e.g. at 424) can be made based on past samples (e.g. at 426). Any appropriate model/interpolation technique can be employed.

By monitoring the changes in pressure, the injected air flow can be tuned for a particular milk type and froth setting, and can also enable the detection of blockages in the steam wand or flow path. Operation of the steam wand can be substantially automated or semi-automated.

Figure 4B:
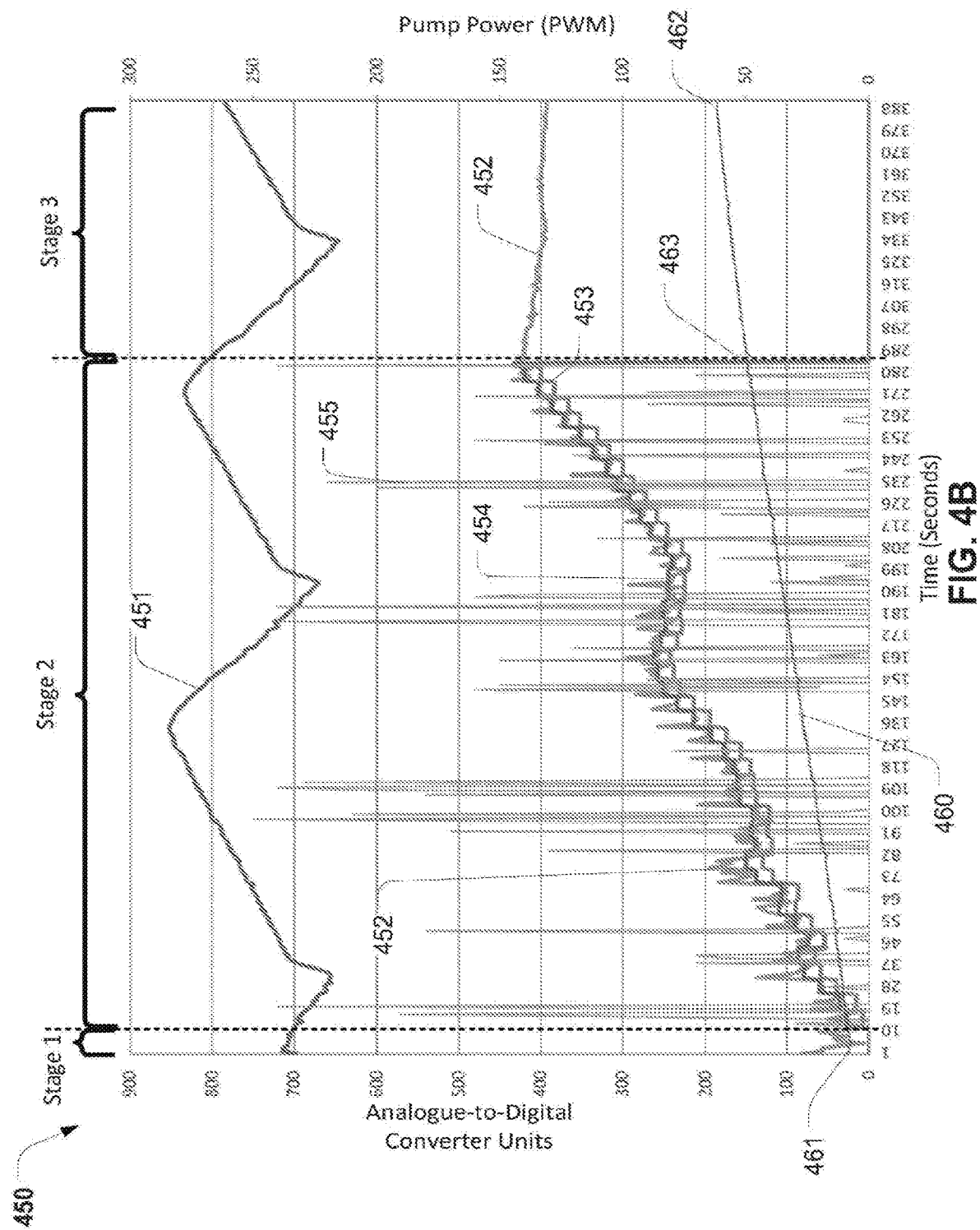
FIG. 4B is a graph depicting control cycles of an embodiment method according to FIG. 3.

FIG. 4B shows another example of the frothing process, this time from start to finish.

The boiler pressure 451 is an indication of the pressure that is present in the steam path (which is used for heating the milk). It will be appreciated that fluctuation in boiler pressure over time can influence the pressure in the steam flow path, and therefore the control of the steam wand pressure and steam output.

The air pressure 452 is the measured pressure in the flow path to the steam wand for frothing. The control pressure 453 signal is the sampled air pressure set point for controlling the pressure in the air path. This sampled air pressure and offset is used to determine or calculate a control target pressure 454. Generally the measured back pressure increases over time, as aur is added and/or the milk is heated.

The pump power 455 is the control signal to the air pump and is indicative of the pump power.

The two signals that are monitored for detecting steam wand blockages are the air pressure 452 and the pump power 455.

The milk temperature 46o starts at an ambient temperature 461, and is heated until the final temperature 462 is reached, when the frothing process ends. It will be appreciated that as a milk temperature reaches an intermediate temperature (at 463), the method proceeds to the next stage.

Blockage Detection

Figure 5A:
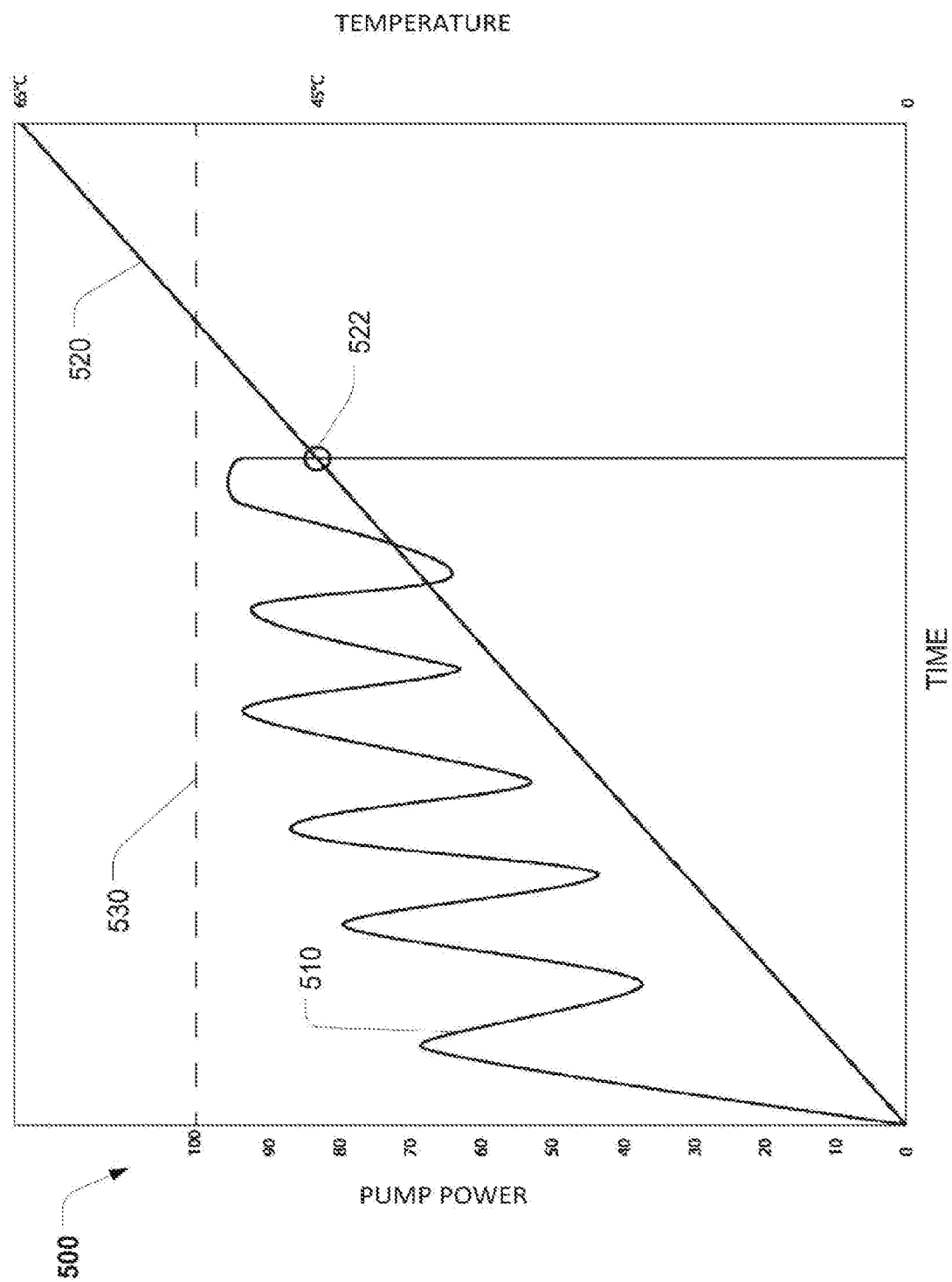
FIG. 5A is a graph depicting the controlled pump power and measured temperature during a milk frothing cycle, showing typical results for an apparatus without a blocked steam wand.
Figure 5B:
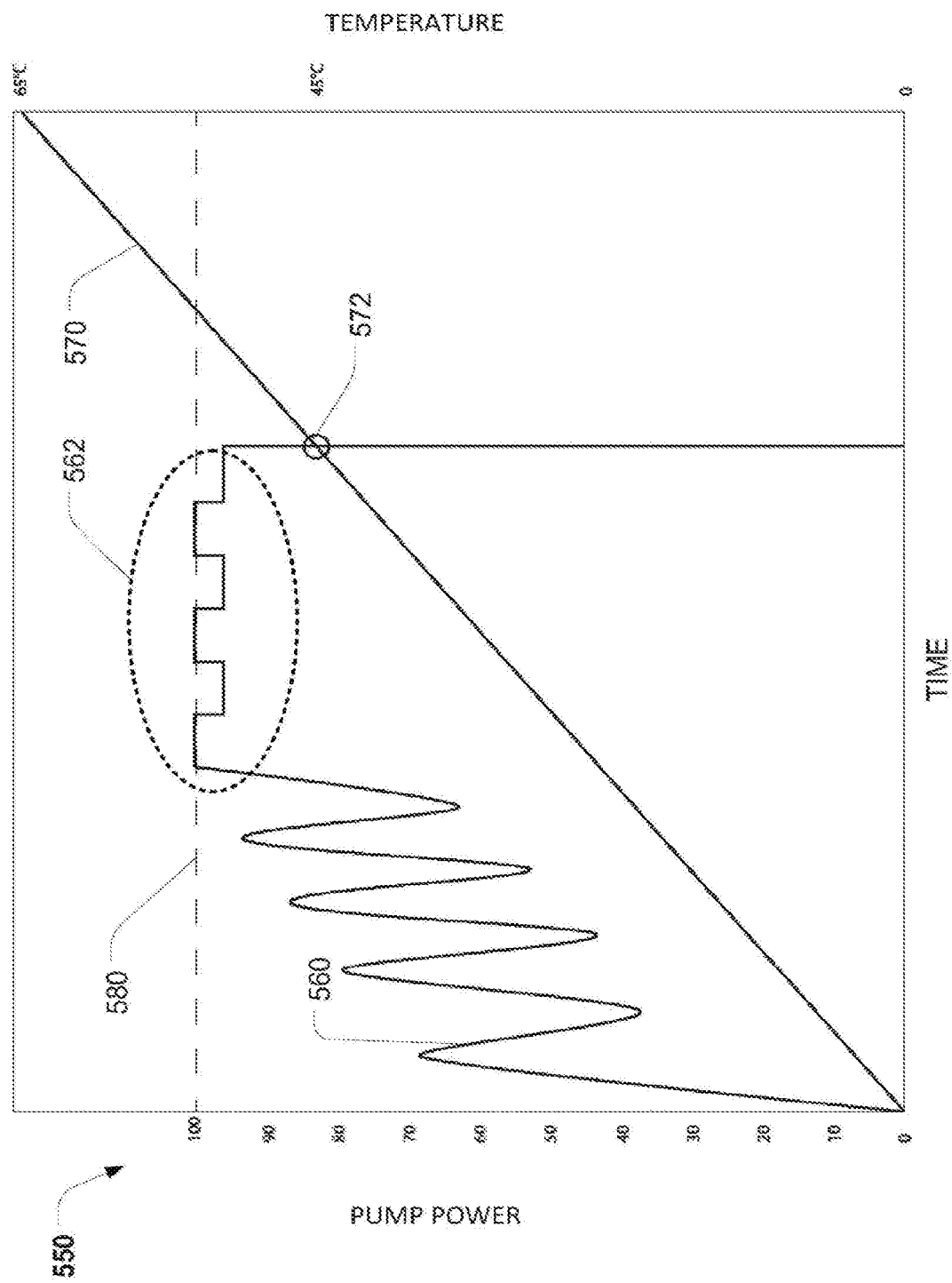
FIG. 5B is a graph depicting the controlled pump power and measured temperature during a milk frothing cycle, showing typical results for an apparatus with a blocked steam wand.

FIG. 5A and FIG. 5B show graphs of both pump power and temperature as a function of time. In accordance with the method 300 described with reference to FIG. 3A and FIG. 3B, the pump is operated over the second stage of the milk frothing method, which concludes when the temperature of the milk reaches an intermediate temperature target (e.g. 45 Deg C.). It will be appreciated that this graph is only indicative of the anticipated measurements as a function of time.

FIG. 5A shows a graph 500 that includes indicative values of pump power and temperature over time during operation of the apparatus according to the method of milk frothing disclosed herein (e.g. Method 300).

In this example, the pump power 510 is varied in accordance with the pressure feedback control loop described in stage 2 of the method 300. The air pump power is varied over time to maintain the pressure set point actively set by the method. The control continues to adjust the set point and control the pump power until the temperature 520 reaches an intermediate target temperature (e.g. 45 Deg C.) at 522 after which the pump is switched off. In this example, the air pump power does not reach 100 percent or some other nominal maximum power 530 anticipated for milk frothing.

In determining the maximum power, the amount of time at or above the pre-set limit can be calculated over the time the pump is operated, and then compared with a threshold value. In this example, the pump power does not reach the predetermined threshold and appears to be operating normally.

FIG. 5B shows a graph 550 that includes indicative values of pump power and temperature over time during operation of the apparatus according to the method of milk frothing disclosed herein (e.g. Method 300).

The control method continues to adjust the set point and control the pump power until the temperature 570 reaches an intermediate target temperature (e.g. 45 Deg C.) at 572, after which the pump is switched off.

In this example, the pump power 560 is controlled according to the method, which required the pump power to reach maximum power 580 for more than a threshold amount of time at 562. It will be appreciated that this can be indicative of the pump not operating correctly or at full capacity or the nozzle being blocked causing the measure pressure to increase to thereby require an increased pressure set-point according to the method.

In determining whether or not the pump has reached a maximum threshold and/or has exceeded the maximum threshold for a predetermined time, it is possible to record (typically using time sampling) instances where the pump is at or above a predetermined threshold to thereby calculate the amount of time in which the pump is operating outside expected parameters. Alternatively, a time weighted average can be calculated such that if the time weighted average exceeds a predetermined threshold, it is considered the pump has operated outside its anticipated parameters.

Figure 6A:
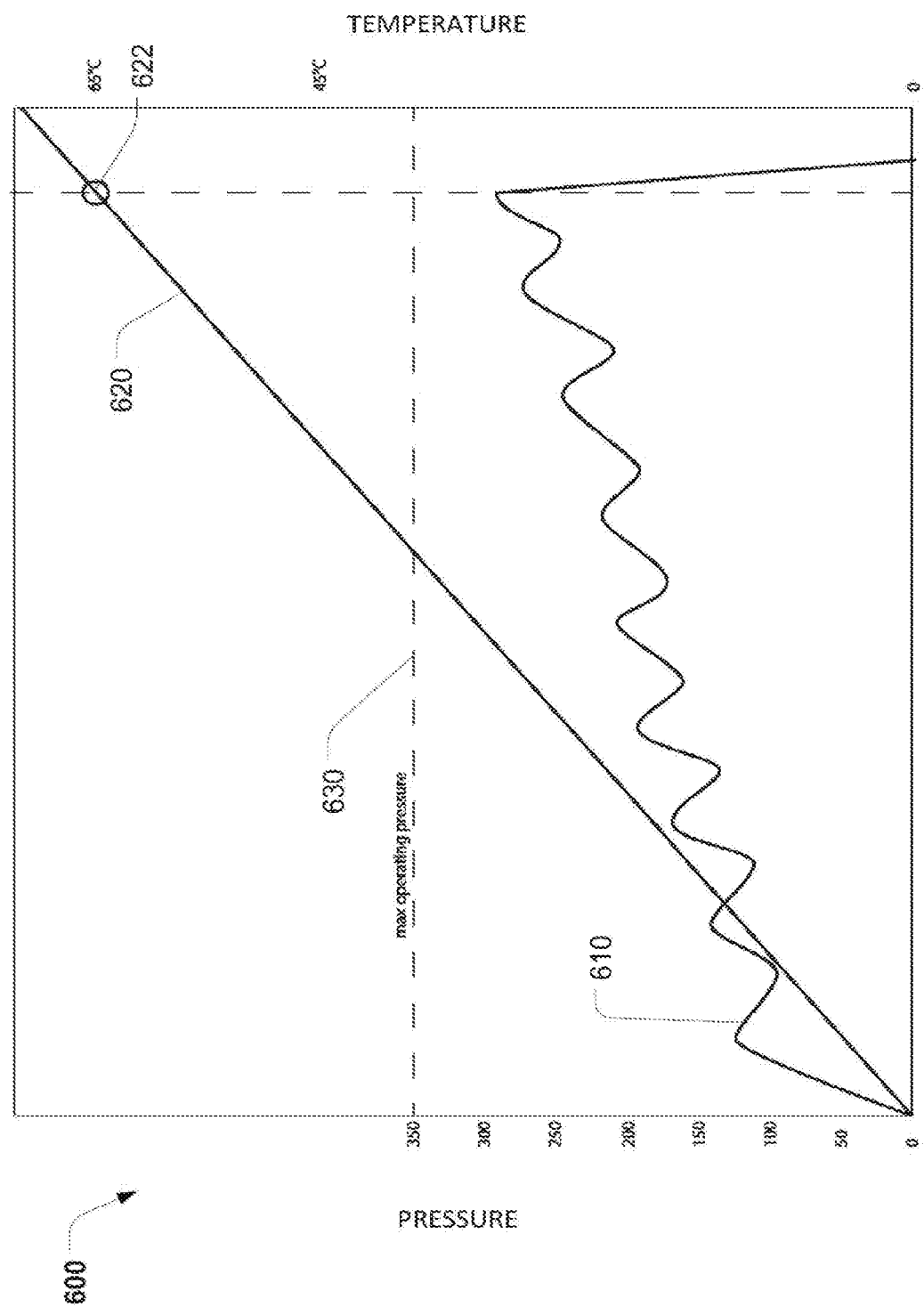
FIG. 6A is a graph depicting the measured air pressure and measured temperature during a milk frothing cycle, showing typical results for an apparatus without a blocked steam wand.

FIG. 6A and FIG. 6B show measured base-line pressure and temperature as a function of time (e.g. as measured by pressure transducer 154 and temperature sensor 156 in FIG. 1).

It would be appreciated in these examples, and according to the method 300, the apparatus operates until the milk temperature reaches a final target temperature (for example 65 Deg C.), through which the air pressure and temperature can be monitored.

FIG. 6A shows a graph 600 indicative of air pressure 610 and temperature 620 as a function of time, by way of example only, in which the pressure is adjusted according to a pressure calculation (see step 310 in FIG. 3A) until the milk temperature reaches an intermediate temperature (e.g. 45 Deg C.), and the base-line pressure can then continue to be monitored until the completion of the method when the milk reaches a final temperature (e.g. 65 Deg C.) at 622.

In this example, the air pressure is monitored and is recorded to indicate that the air pressure does not exceed a maximum anticipated operating pressure 630, either at any point in time or over a time weighted average. It will be appreciated that the pressure measurements are scaled according to any pressure transducer and analogue-to-digital converter used to make the measurement (however the units of measure are the same as the offset measurement, as shown in Table 1, used in calculating the target set-point). Accordingly, the anticipated maximum operating pressure is a value according to the anticipated range of measurements determined by the relevant transducer and analogue to digital conversion circuitry.

FIG. 6A show the pressure fluctuating, but continues to present under the anticipated maximum operating pressure 630. Accordingly, it is anticipated that, by maintaining pressure under the maximum anticipated operating pressure, the steam wand is not blocked.

FIG. 6B shows a graph 650 of air pressure 660 and temperature 670 as a function of time, being indicative of a blocked steam wand.

The control method continues to adjust the set point and control the pump power 510 until the temperature 670 reaches an intermediate target temperature (e.g. 45 Deg C.) at 672.

In this example, the air pressure 660 is continued to be monitored, and is recorded to exceed the maximum anticipated operating pressure at 662.

It is understood that with a blocked steam wand or nozzle, pressure can continue to increase due to the pressure provided by the boiler or steam generating unit. The measured pressure can be recorded (typically by time sampling) to record the amount of time the measured air pressure exceeds a maximum anticipated operating pressure 680 (typically pre-set). Alternatively, a time weighted average of the air pressure measurements can be taken, such that if a time weighted average exceeds a maximum anticipated operating pressure, it is considered that the apparatus has exceeded the pressure for a predetermined time or average.

If the pressure measured does not exceed the threshold, but the pump power does, then it may be assumed that there is no blockage in the steam wand, but that the pump may be malfunctioning (e.g. if it is aging or requires a service).

On the other hand, if both the pump power and the pressure exceed their respective thresholds, it may be assumed that the wand is blocked. In this instance, the user interface may display wand cleaning instructions to the user.

Temperature Sensor and Co-Operating Drip Tray

Figure 7:
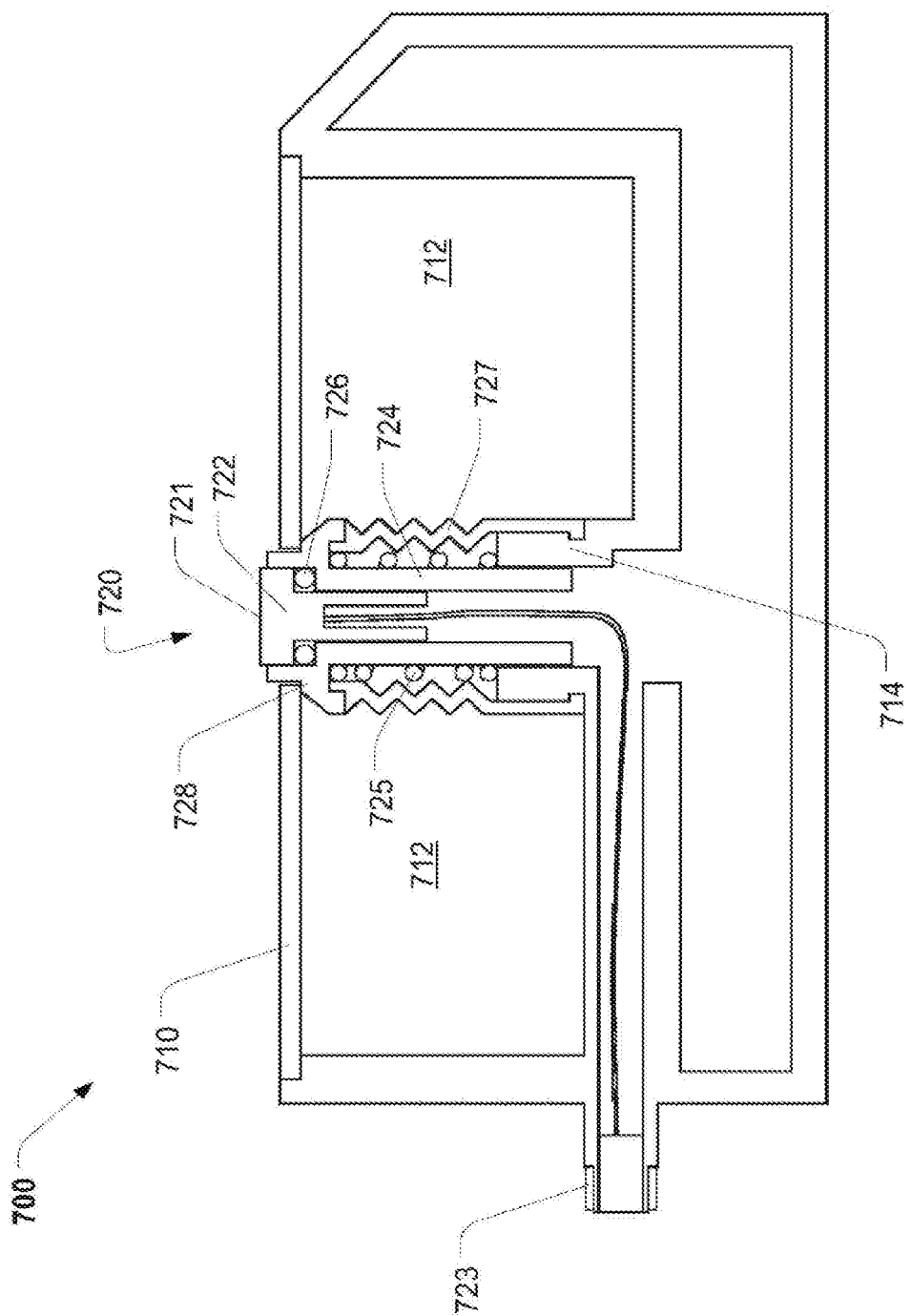
FIG. 7 shows an example embodiment drip tray having an inbuilt temperature sensor.

FIG. 7 shows an example embodiment drip tray 700 having an inbuilt temperature sensor.

In this example embodiment, the drip tray provides a support surface 710 for receiving a jug during a milk froth operation. A temperature sensing assembly 720 is biased to an exposed configuration, such that a temperature sensing surface 721 protrudes through (and is above) the support surface 710 for enabling the sensor to engage and thermally couple with a supported jug. Placing a jug on the temperature sensor causes it to lower against a bias such that thermal coupling is maintained.

In this embodiment, the temperature sensor assembly 720 includes a negative temperature coefficient (NTC) sensor 722 that is electrically coupled to a socket portion 723. The drip tray defines a reservoir portion 712 about the temperature sensing assembly 720. The temperature sensing assembly 720 has a chassis 724 that slidably engages through a floor portion 714 of the reservoir, and is biased into a raised configuration by a compression spring 725. An O-ring seal 726 and flexible cover 727 are provided to seal the temperature sensing assembly 720 from the reservoir 712. The temperature sensing assembly 720 can include an abutment surface 728 that engages the drip tray support surface 710 for limiting the height of the temperature sensing surface 721 when in the raised configuration. The support surface 710 is typically provided in the form of a perforated platform that is removable for cleaning. It will be appreciated that the drip tray provides a reservoir 712 about the temperature sensing assembly 720.

It will be appreciated that an embodiment coffee making and/or milk frothing apparatus is releasably engagable with a drip tray that enables waste water/steam ingress to the drip tray. When a drip tray is coupled to an apparatus that requires waste water to egress from the apparatus to the drip tray, the drip tray can be further configured with a separate ingress port typically associated with or located about the coupling.

By way of example only, a coffee making apparatus or milk frothing apparatus may have a steam/waste water egress that engages the drip tray in fluid communication with an ingress port (not shown). This fluid flow coupling can be made with or without electrical coupling for a temperature sensor. A one way valve can be provided to restrict water held in the drip tray from spilling as the drip tray is removed from the apparatus. The one way valve can be automatically opened as the drip tray is coupled to the apparatus, and automatically closed as the drip tray is removed or separated from the apparatus. Fluid sealing of the coupling can be provided (for example using an O-ring or other sealing means).

By way of example only, an embodiment drip tray may include a coupling element having an ingress flow path for receiving waste water/steam and an electrical coupling for communicating a temperature signal from a temperature sensor.

Figure 8A:
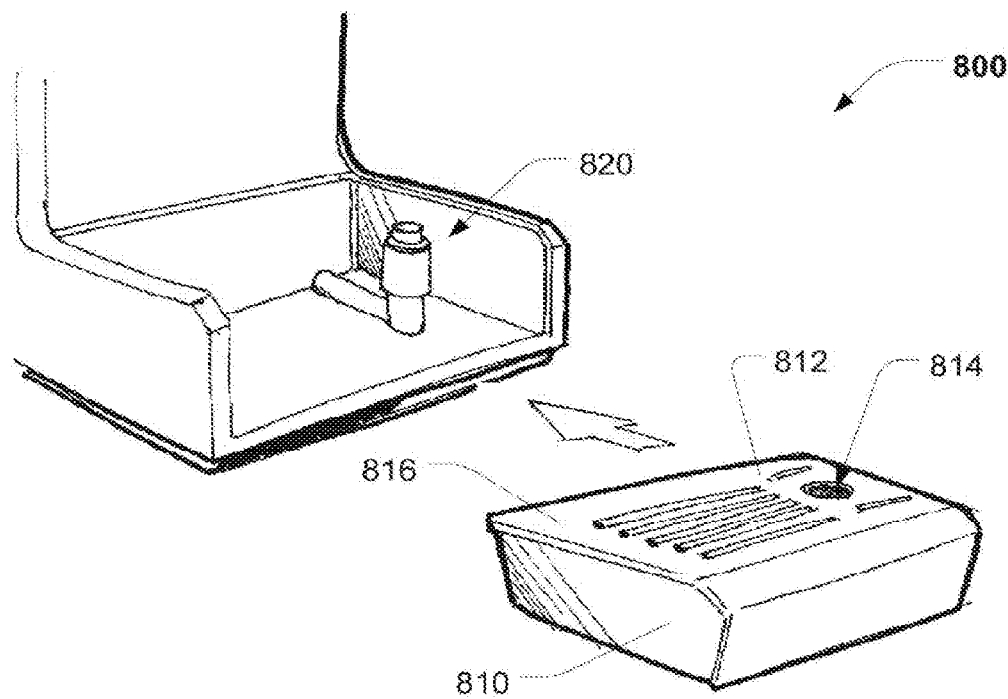
FIG. 8A and FIG. 8B show an example embodiment apparatus having an in-built temperature sensor and a cooperating drip tray.
Figure 8B:
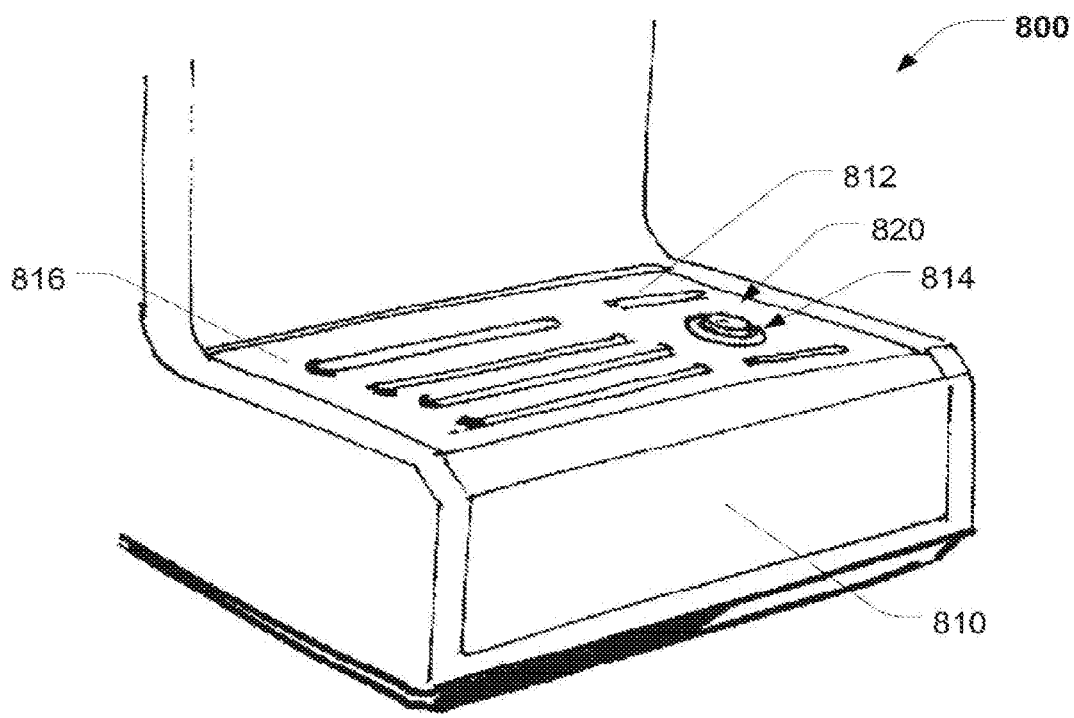

FIG. 8A and FIG. 8B show an alternative embodiment apparatus 8o that includes a drip tray 810 that cooperates with a temperature sensing apparatus 820.

It will be appreciated that the primary components of the temperature sensing apparatus 820 may substantially conform to those of the temperature sensing apparatus 720, as shown in FIG. 7.

In this example, the temperature sensing apparatus 820 is fixed to the body of a milk frothing machine or espresso machine, and is separate from the drip tray 810. By way of example only, the temperature sensing apparatus 820 may be fixed to a lower portion of a recess defined to receive the drip tray 810 and/or may be fixed to a side portion of a recess defined to receive the drip tray 810.

In use, the drip tray 810 may be slid into a recess of the milk frothing machine or espresso machine, in which the upper surface portion 812 of the drip tray slides over the temperature sensing apparatus 820 that is received through an aperture 814.

It would be appreciated that the temperature sensing apparatus 820 can be biased to an extended configuration that causes the temperature sensor to sit above the upper surface of the drip tray 816.

The sliding of the drip tray 810 can be further assisted by first pressing down the temperature sensing apparatus against the upward bias (either manually or through application of an abutment surface defined by the drip tray), causing it to ride under the upper portion 812 of the drip tray 810. Alternatively, the drip tray 810 may be lowered, from above, over the temperature sensing apparatus 820 such that it is received through an aperture 814.

Figure 9A:
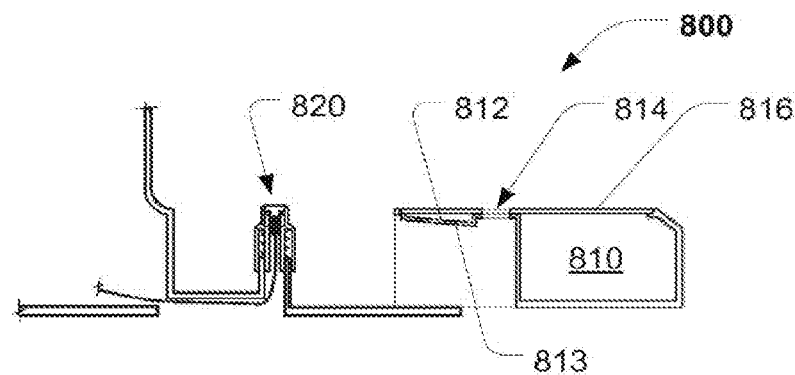
FIG. 9A through FIG. 9C show sectional views of an example embodiment apparatus having an in-built temperature sensor and a cooperating drip tray, showing a series of steps associated with engaging the cooperating drip tray with the apparatus and temperature sensor.
Figure 9B:
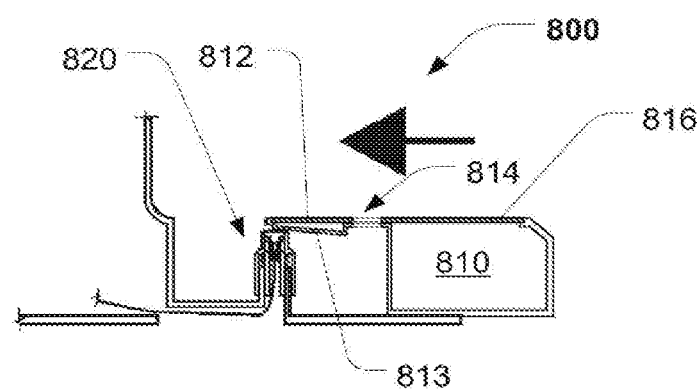
Figure 9C:
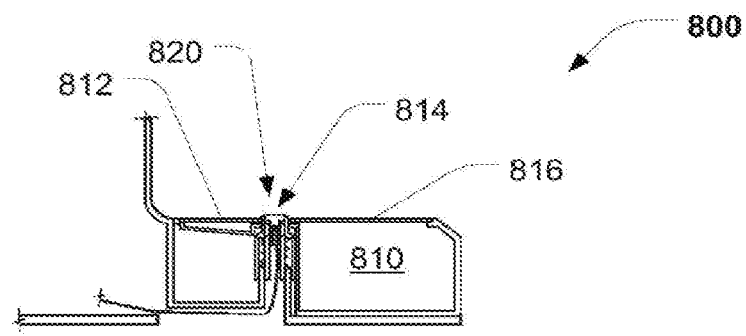
Figure 10:
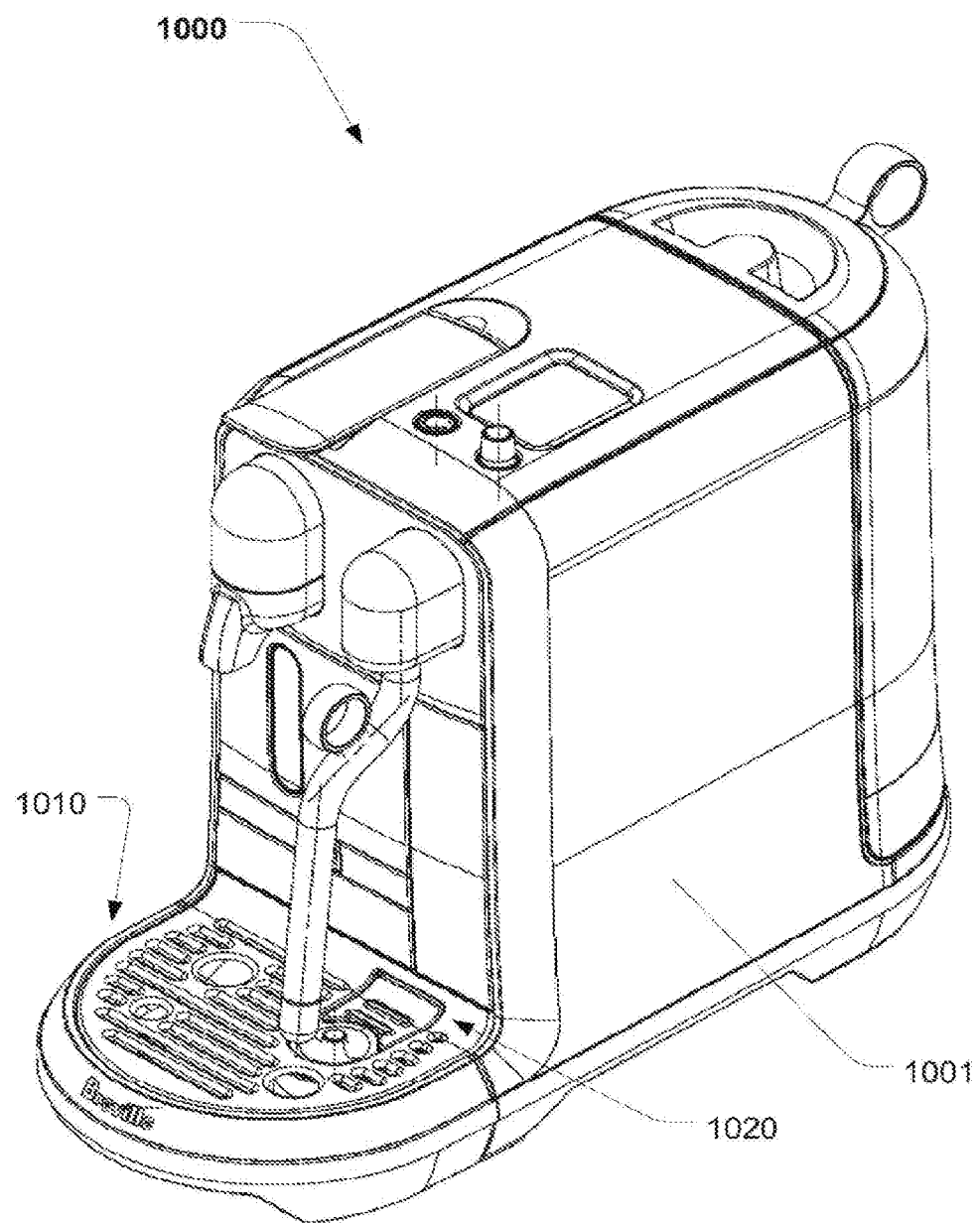
FIG. 10 shows an embodiment milk frothing apparatus.

FIG. 9A through FIG. 9C show a sectional view of an embodiment apparatus 800 that includes a drip tray 810 that cooperates with a temperature sensing apparatus 820.

In this example, the drip tray 810 is slid into position from the front of the milk frothing machine or espresso machine (as best shown in FIG. 9A), such that the upper portion 812 slides over the temperature sensing apparatus 820 causing it to lower against its upward bias when contacting an abutment surface 813 (as best shown in FIG. 9B), until it is reaches the aperture 814 and re-extends to the upward configuration through the aperture (as best shown in FIG. 9C).

Temperature Sensor Assembly

Figure 15:
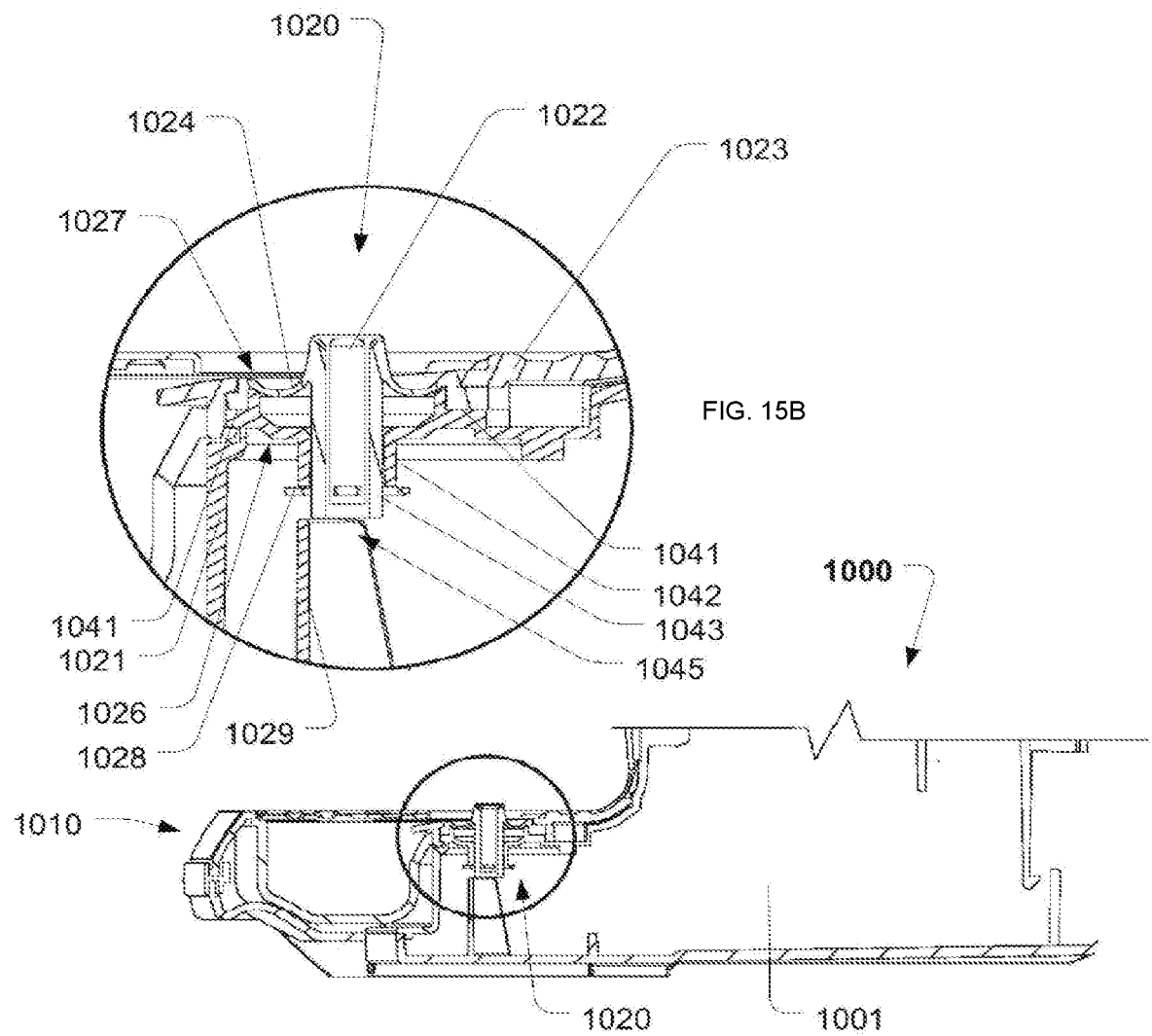
FIG. 15A shows a sectional view of a temperature sensor assembly for the milk frothing apparatus.
FIG. 15B shows an enlarged sectional view of the temperature sensor assembly of FIG. 15A.

FIG. to through FIG. 15 show an embodiment milk frothing apparatus 1000 having a removable drip tray 1010 and/or a temperature sensor assembly 1020.

Figure 16:
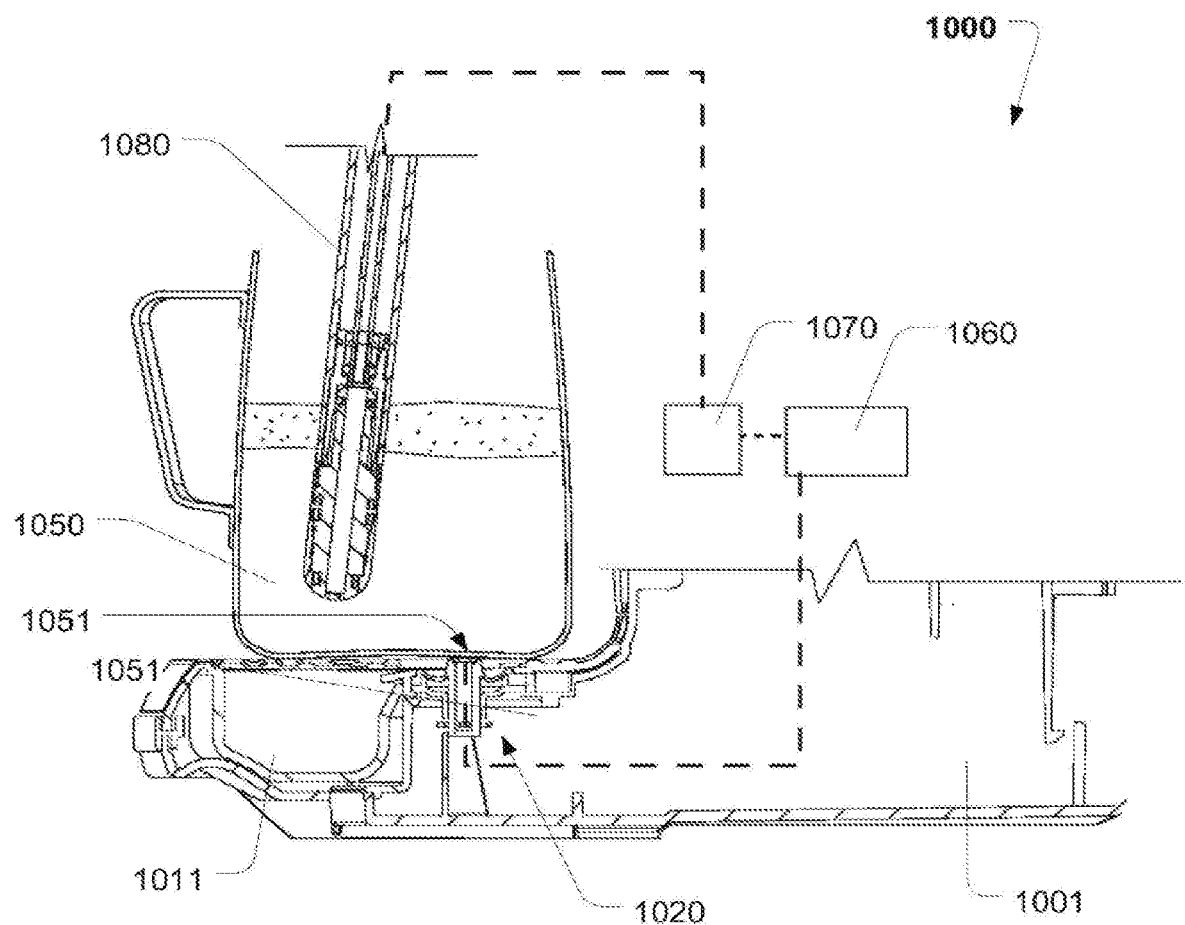
FIG. 16 shows a part sectional view of a milk frothing apparatus having a temperature sensor thermally coupled to a jug.

A temperature sensor assembly 1020 is located towards the end of a protruding portion 1021 that extends from the body of the apparatus 1001. The temperature sensor assembly 1020 includes a temperature sensor element 1022 that is biased upward for engaging an underside of a jug (e.g. as shown in FIG. 16).

Figure 11:
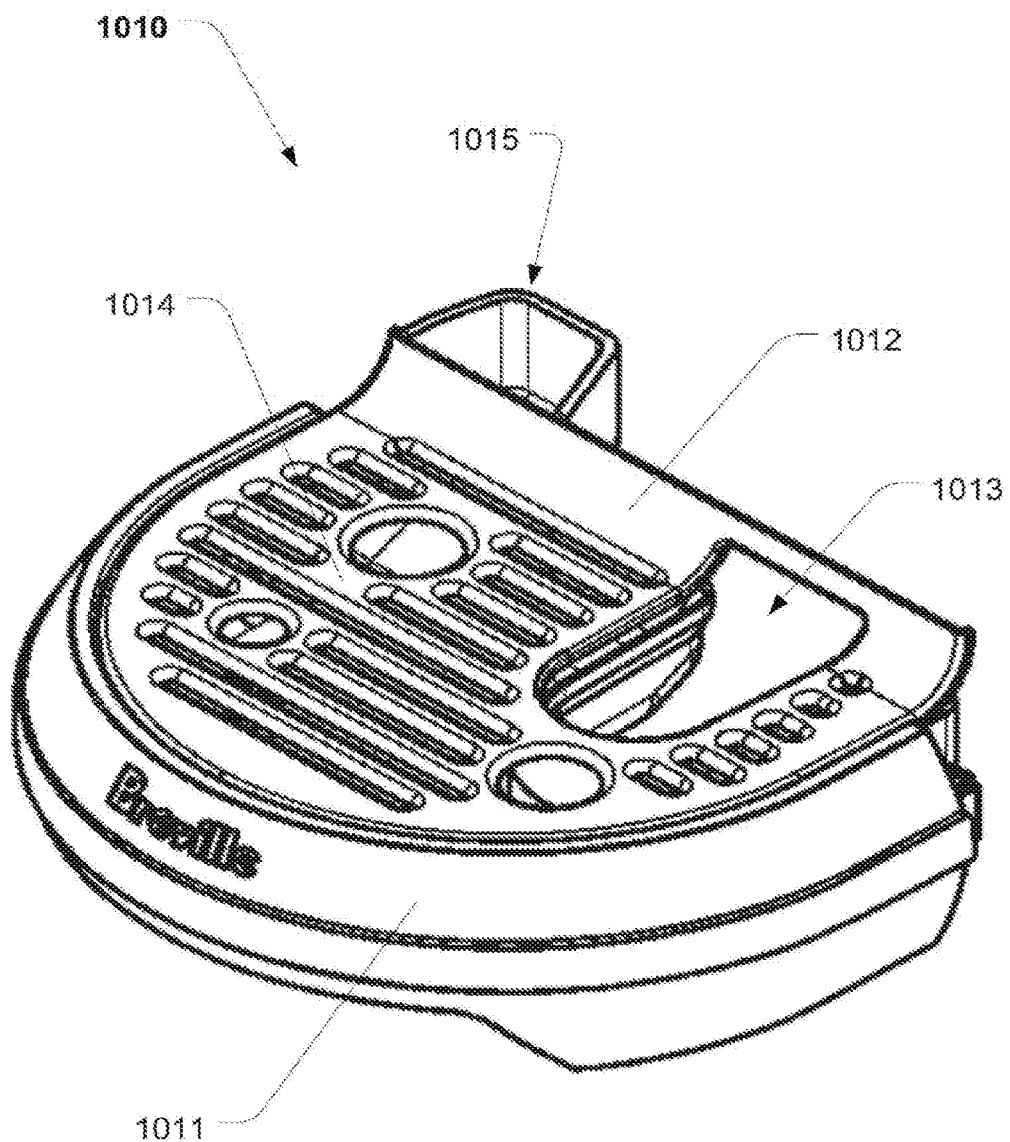
FIG. 11 shows an embodiment removable drip tray for the milk frothing apparatus of FIG. 10.

FIG. 11 shows an embodiment removable drip tray 1010 for the milk frothing apparatus 1000. The drip tray has a reservoir 1011. The drip tray has a raised leading lip 1012 such that, when being inserted to engage the body of the apparatus 1001, the temperature sensor can pass through and into an opening 1013. In this embodiment, the opening 1013 extends up the raised lip to provide clearance for the temperature sensor when in the biased raised position. In an alternative embodiment, the drip tray can have a raised leading lip 1012 such that, when being inserted to engage the body of the apparatus 1001, the lip directs the temperature sensor beneath (against its bias) and into an opening 1013 that receives the temperature sensor assembly 1020. A grate 1014 is formed as an upper surface of the drip tray for supporting a jug in use. A through passage 1015 is in communication with the reservoir 1011 and cooperates with the body of the apparatus 1001 to receive overflow fluid.

Figure 12A:
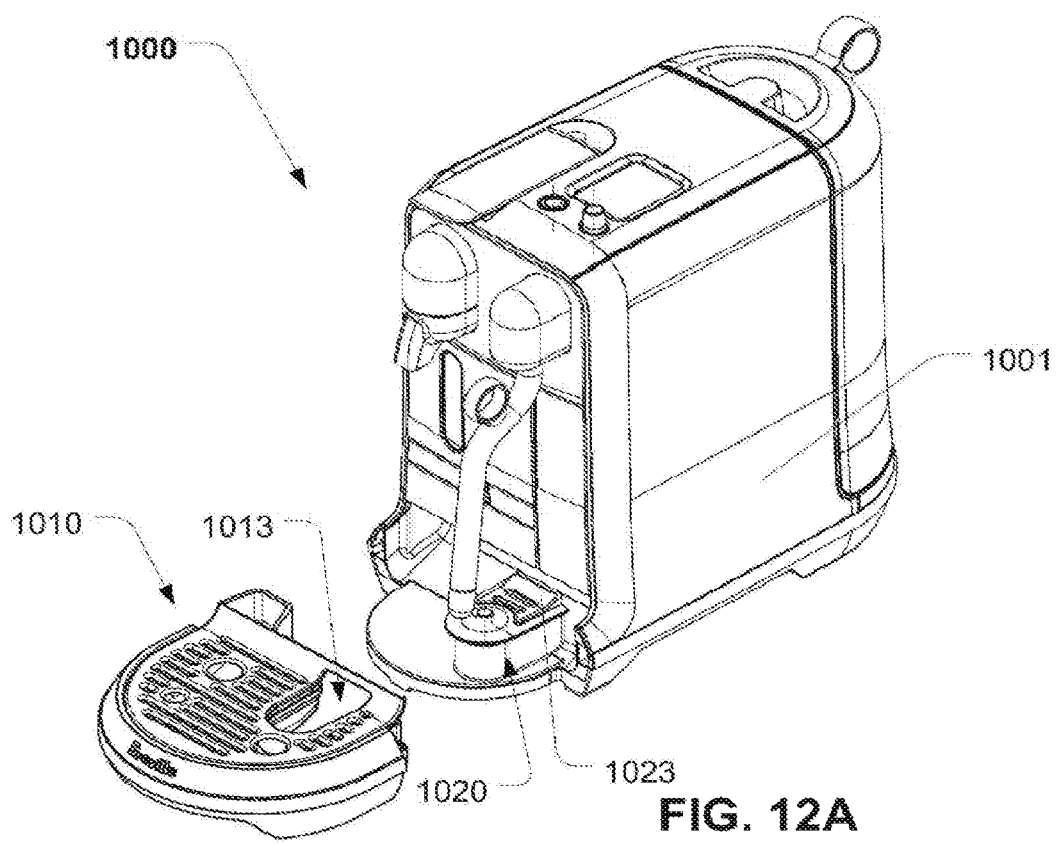
FIG. 12A and FIG. 12B shows the milk frothing apparatus of FIG. 10, wherein the drip tray is being attached or removed.
Figure 12B:
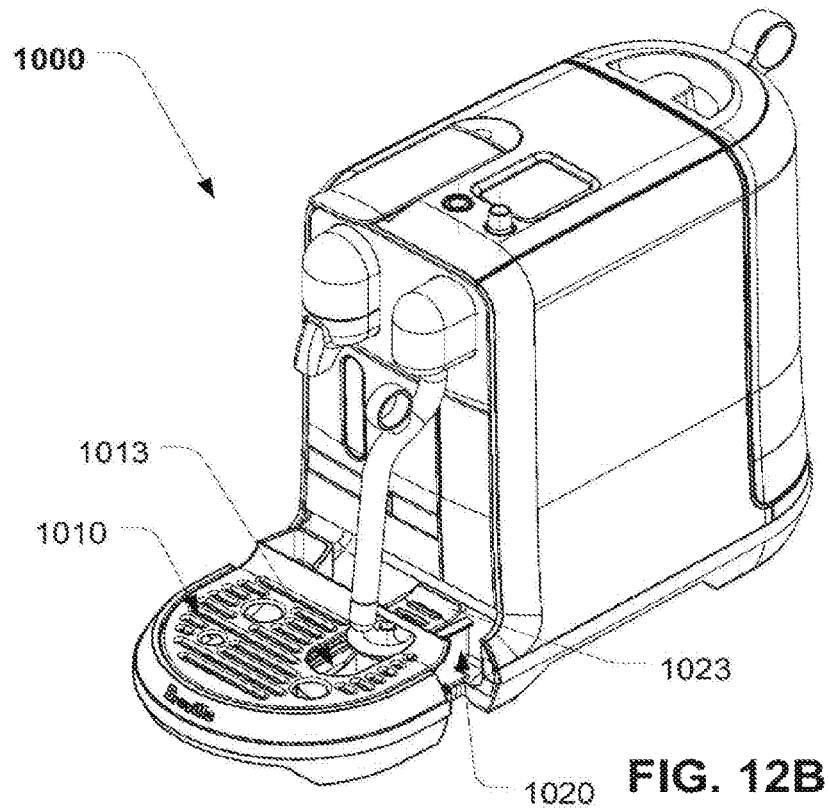

FIG. 12A and FIG. 12B shows the milk frothing apparatus 1000, wherein the drip tray 1010 is being attached or removed from the body of the apparatus 1001. It will be appreciated that the temperature sensor assembly 1020 is received by the drip tray 1010, whereby the upper surface 1023 of the temperature sensor assembly 1020 substantially covers the opening 1013 in the upper surface of the drip tray.

Figure 13A:
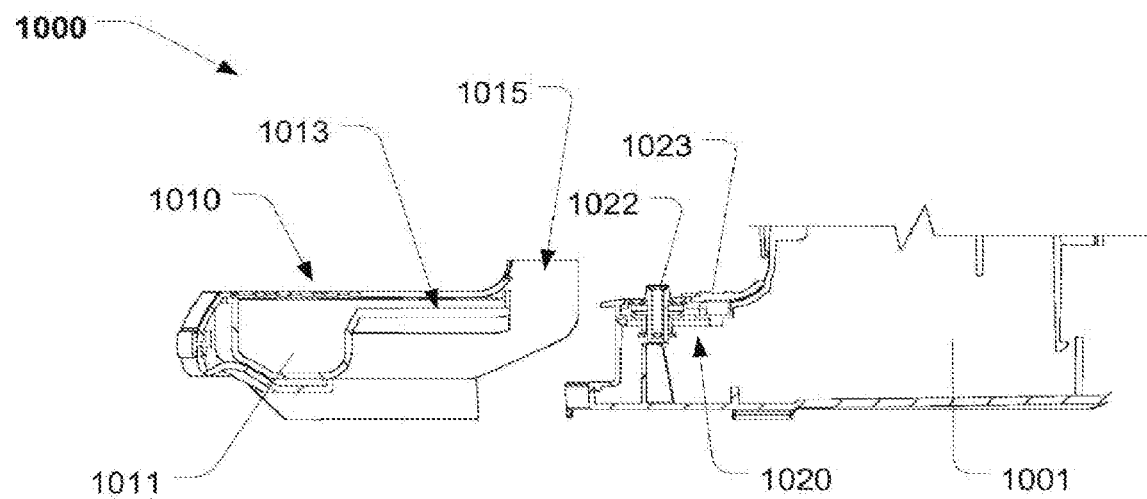
FIG. 13A through FIG. 13C shows sectional views of the milk frothing apparatus of FIG. 10, wherein the drip tray is being attached or removed.
Figure 13B:
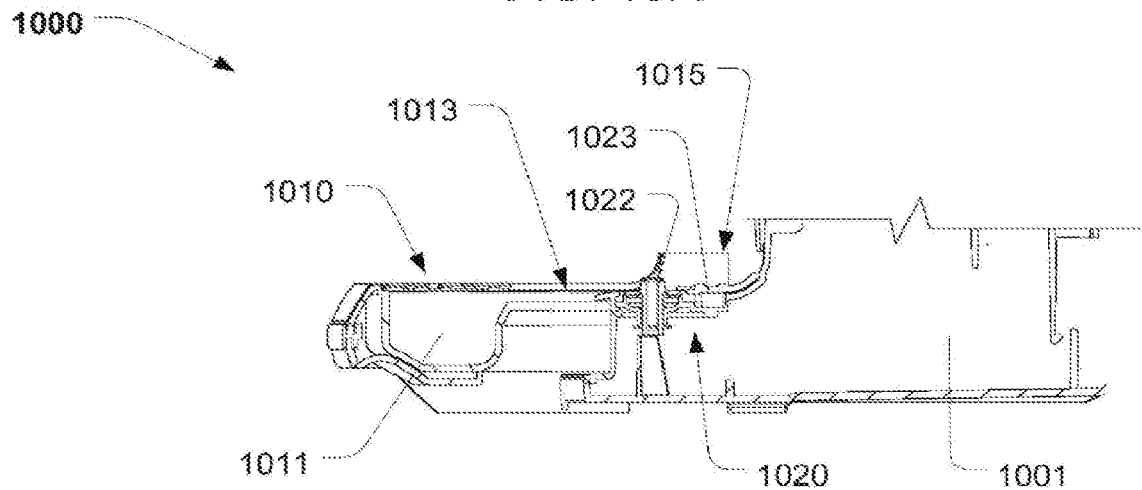
Figure 13C:
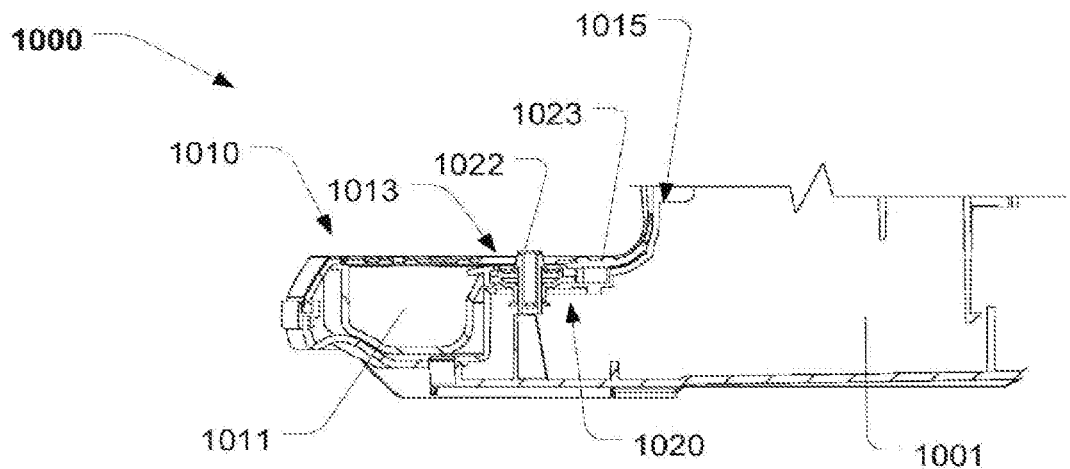

FIG. 13A through FIG. 13C further shows sectional views of the milk frothing apparatus 1000, wherein the drip tray 1010 is being attached or removed.

Figure 14:
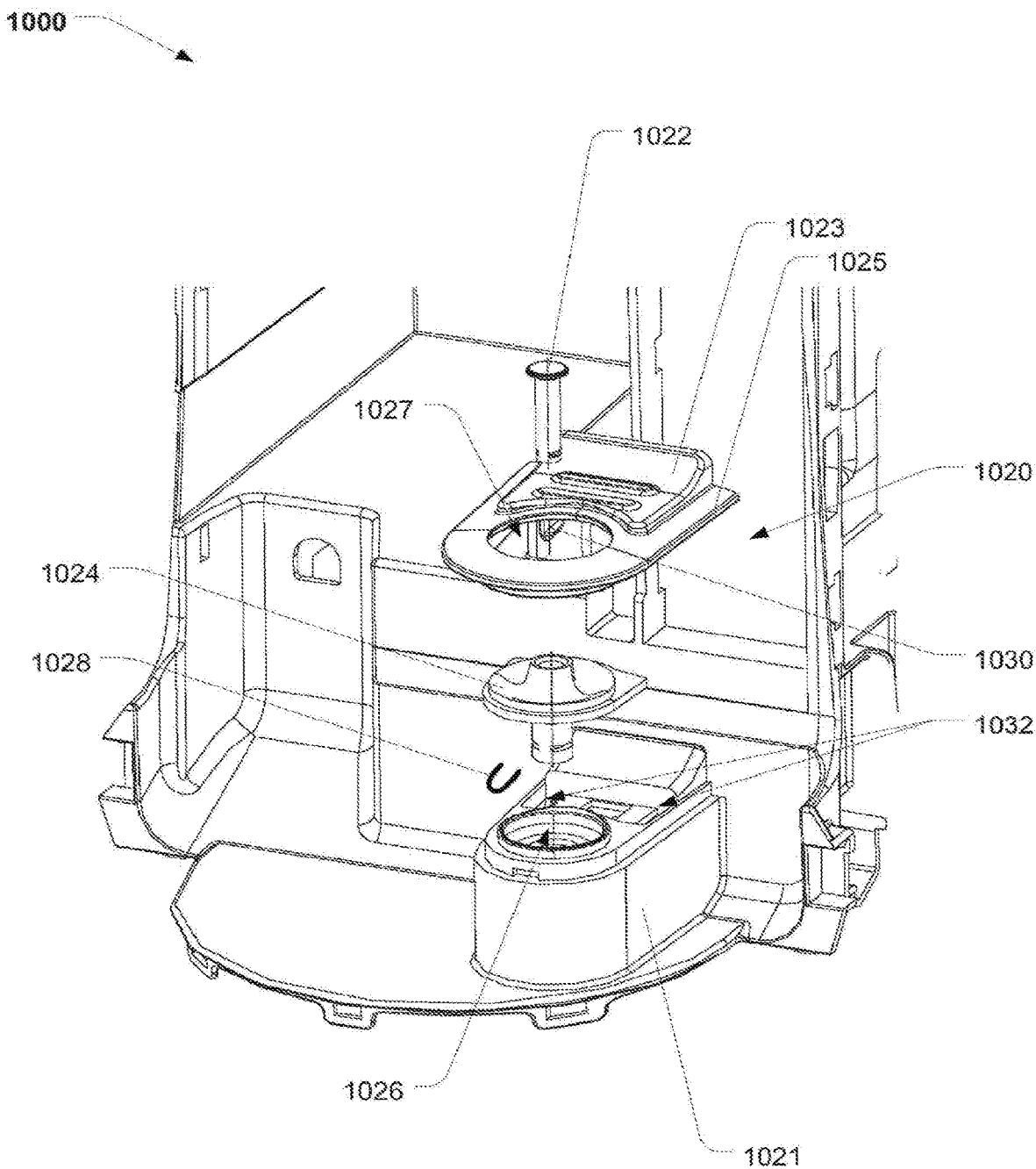
FIG. 14 shows an inline for assembly view of a temperature sensor assembly for the milk frothing apparatus.

FIG. 14 shows an inline assembly view of a temperature sensor assembly 1020 for a milk frothing apparatus.

A temperature sensor assembly 1020 includes a temperature sensor element 1022 and a resilient support element 1024 that receives and biases the temperature sensor element 1022 towards thermal communication with the underside of the texturing vessel or jug.

The support can also form a seal between protruding portion 1021 and the separate upper surface element 1023. It will be appreciated that the protruding portion 1021 has an aperture 1026 for receiving the temperature sensor, which is covered by the resilient support element 1024. The upper surface element 1023, having an aperture 1027, is then located atop the resilient support element 1024 to form a seal for limiting ingress of fluid through the aperture 1027 (or 1026). The upper surface element 1023 is turned down towards the edge to encourage runoff into the assembled drip tray, and can have an overhanging drip edge 1025 to further direct liquid into the drip tray reservoir. The top surface of the temperature sensor assembly is convex to promote liquid or fluid movement into the drip tray reservoir.

The resilient support element 1024 is held in compression between the protruding portion 1021 of the body or chassis and the upper surface element 1023 for creating a water tight seal. The upper surface element 1023 is securely attached to the protruding portion 1021 of the body or chassis. For example, the upper surface element 1023 may be securely attached to the protruding portion 1021 of the body or to chassis by one or more press clips 1030 extending from the underside that engage cooperating recesses 1032 in the protruding portion.

The temperature sensor element 1022 is retained within the resilient support element 1024 via a slight resistance fit and a U clip 1028 that engages both, and which prevents the temperature sensor element being removed. The U clip prevents the temperature sensor element 1022 from being pulled upward, and prevents the temperature sensor element 1022 being deflected too far downward due to it engaging the chassis. For example, a rib 1029 on the chassis can prevent the temperature sensor element 1022 from excessive downward deflection.

FIG. 15A shows a sectional view of a temperature sensor assembly for the milk frothing apparatus. FIG. 15B shows an enlarged sectional view of the temperature sensor assembly.

Referring to FIG. 15B, it will be appreciated that: the shoulder 1041 of the protruding portion 1021 supports the resilient support element 1024, such that resilient support element is captured and abutting held about the apertures of the protruding portion 1021 and the upper surface element 1023; a sleeve 1042 defined by the protruding portion 1021 captures the downwardly extending outer wall 1043 of the resilient support element 1024; and the void space 1045 below the resilient support element allows sufficient downward travel of the resilient support element.

FIG. 16 shows a part sectional view of a milk frothing apparatus having a temperature sensor element 1021 thermally coupled to a vessel or jug 1050 (at 1051). The temperature sensor element 1021 is further coupled to a processor module 1060 that receives a temperature signal. The processor module controls the steam generation module 1070 that generates steam delivered to a steam wand 1080 positioned in the vessel or jug 1050. The processor module can perform a method of frothing milk.

Steam Algorithm

Figure 17:
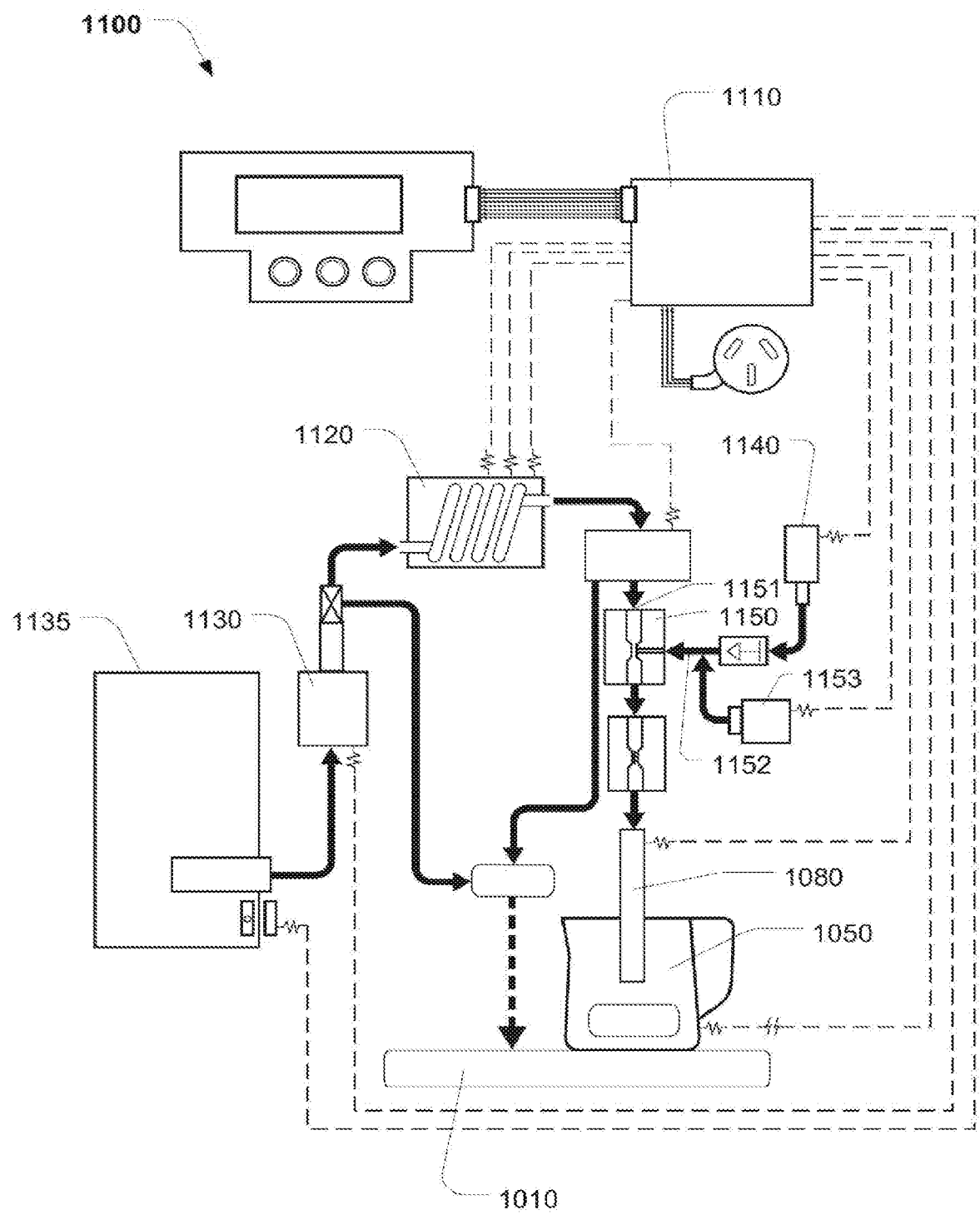
FIG. 17 is a schematic diagram of an embodiment milk frothing apparatus.

FIG. 17 is a schematic diagram of an embodiment milk frothing apparatus 1100.

By way of example, the apparatus 1100 includes a control or processor module 1110, a low thermal mass heating module 1120, a water pump 1130 coupled to a reservoir 1135 for providing water to the heating module to generate a steam source, a low volume variably regulated air pump 1140 for generating an air source, and an ejector module 1150 (e.g. venturi/T-junction) that enables the steam source 1151 and air source 1152 to be combined.

Figure 18:
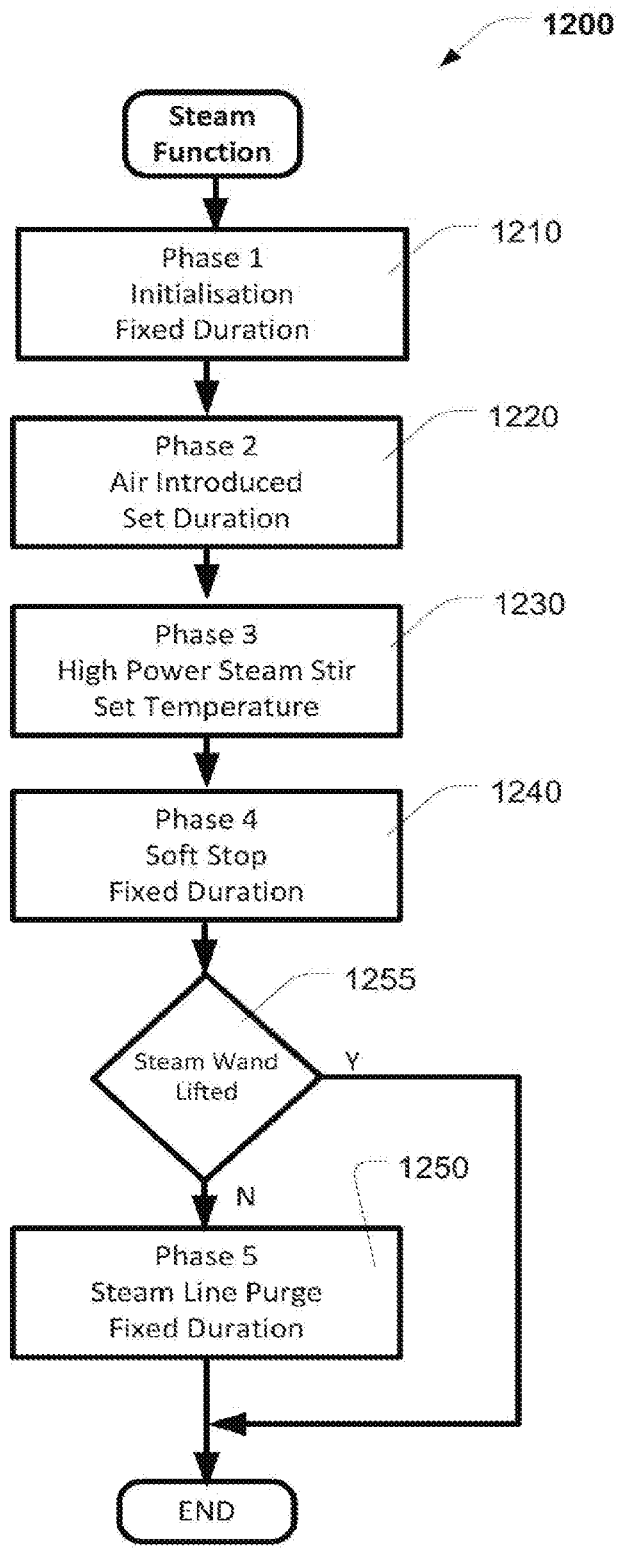
FIG. 18 is a flow chart for an embodiment method of frothing milk.

FIG. 18 is a flow chart for an embodiment method 1200 of frothing milk using a multi-phase texturing cycle. The method is performed by an apparatus. For example, method may be performed by an apparatus 1100 as shown in FIG. 15, or another apparatus disclosed herein.

By way of example only, the method 1200 comprises the steps of:

STEP 1210: "Phase 1" involves steam generation initialization.

Phase 1 typically operates for a fixed duration. The heater modules can operate at full or high power (e.g. 1500 W). The water pump starts after the heater reaches 110.degree. C. (e.g. measured using a temperature sensor) to ensure steam is created and injected into the steam flow path. By way of example, this phase can lasts for 5 seconds, whereby after 5 seconds the heater is operated at a reduced power (e.g. 900 W). The air pump is not required at this stage.

STEP 1220 "Phase 2" involves air introduction.

In Phase 2, the heater operates at a lower power (e.g. 900 W) and steam pressure is kept low (e.g. approx. 0.8-0.9 Bar). This enables a cost effective air pump to be used to supply air to the injector module. The duration of phase 2 is based on the user selected foam level.

STEP 1230: "Phase 3" involves a high power steam stir.

The heater is operated in phase 3 at a predetermined power setting, which by way of example may be the same power level as used in phase 2 or higher than used in phase 2 or a maximum power setting. Air pump is not working at this phase. The low thermal mass heater allows steam temperature and pressure to rise quickly to desired level, and the back pressure reaches highest measurements (e.g. 2 Bar). This high pressure steam stirs the milk and air bubbles introduced in phase 2. The duration of phase 3 can be temperature dependant based on a user selected milk temperature or otherwise configured by a user. As the milk reaches the selected milk temperature, the method advances to phase 4.

STEP 1240: "Phase 4" soft stop.

When milk temperature reaches desired temperature (e.g. user selected 65.degree. C. with an offset of 10.degree. C.) Phase 4 starts (e.g. at 55.degree. C.). The steam hydraulic line stores steam pressure, if the steam is shut off suddenly, pressure will be released into frothed milk and creates undesired bubbles. Reducing the heater temperature can assist in reducing scale build up. Power is reduced from 1500 W to 900 W and then 300 W over a fixed duration of 5 seconds.

STEP 1250: "Phase 5" steam line purge

While the heater is not powered, the water pump is pulsed (e.g. 4 times-0.5 second on, 0.5 second off). This can reduce heater temperature further to 60.degree. C., which is most suitable for water scale deposit avoidance.

By way of example only, foam level settings may be assigned the following duration for phase 2.

| Foam level settings | Duration of phase 2 |
|---|---|
| 1 | 5 sec |
| 2 | 8 sec |
| 3 | 12 sec |
| 4 | 15 sec |
| 5 | 20 sec |
| 6 | 25 sec |

A pressure transducer (e.g. reference 1153 of FIG. 17) can be used in controlling or maintaining an appropriate pressure in Phase 2 (STEP 1220). Due to manufacturing tolerances, system dimensions can vary. For example, if steam tip aperture is slightly larger or smaller, which causes the steam back pressure to be lower or higher respectively. The pressure transducer can detect the steam back pressure and be used in controlling air pump power accordingly, such that the air volume introduced is at desired or controlled level(s).

A pressure transducer (e.g. reference 1153 of FIG. 17) can be used to monitor pressure and detect blockages. While the heater module is operating at high or full power during stage 3, the temperature and steam pressure can be high or at a maximum level. In events such as: a steam tip blockage, a solenoid valve blockage, a steam pipe rupture—the pressure transducer can be used to quickly detect sudden increase of pressure or loss of pressure, and enable the controller to take appropriate action.

Step 1250 may be bypassed if the steam wand is raised (per STEP 1255 of FIG. 18).

During a multi-phase texturing cycle the controller initiates an air introduction phase (phase 2) by operating the heating source at a lower wattage (.about.900 W) to reduce the steam pressure (0.8-0.9 Bar) in the ejector (venturi/T-junction). The air pump is regulated by the controller for a predefined time (defining the length of the phase) according to the user selected texture level (foam volume). A pressure transducer located after the air pump and monitoring the back pressure in real-time adjusts the power to the pump (power modification) to maintain an optimized air integration volume and texturing mixture.

During a multi-phase texturing cycle the controller receives a signal from a temperature sensor in thermal communication with the texturing liquid (e.g. milk) for determining when it has reached a desired temperature offset defined by the user desired temperature. When the desired temperature offset is reached the controller incrementally reduces the power to the low thermal mass heater from a high % of its maximum capacity until it reaches a low % of its maximum capacity over a predefined duration.

During a multi-phase texturing cycle the controller will receive a signal indicative that the texturing cycle has ended or been terminated (end of phase 4, or 3 where there is no slow stop), and that power to the heating source has been deactivated, and activates the water pump to deliver pulses of water (eg. 0.5 sec duration*a cycle of 4 pulses) through the heating source to the outlet.

It will be appreciated that advantages of this method and system may include:
(a) Low thermal mass heater, provides a quick transition from a coffee mode to a steam mode. After milk frothing cycle, the heater is temporarily maintained at a low temperature (6 deg C.) for reducing scale build up in the heater.
(b) Ability to monitor and vary steam pressure, using a smaller volume air pump. High pressure steam provides optimum milk and air bubble mixing results. A soft-stop at the end of cycle reduces steam pressure towards the end of milk frothing cycle for eliminating unwanted bubble.

Figure 19:
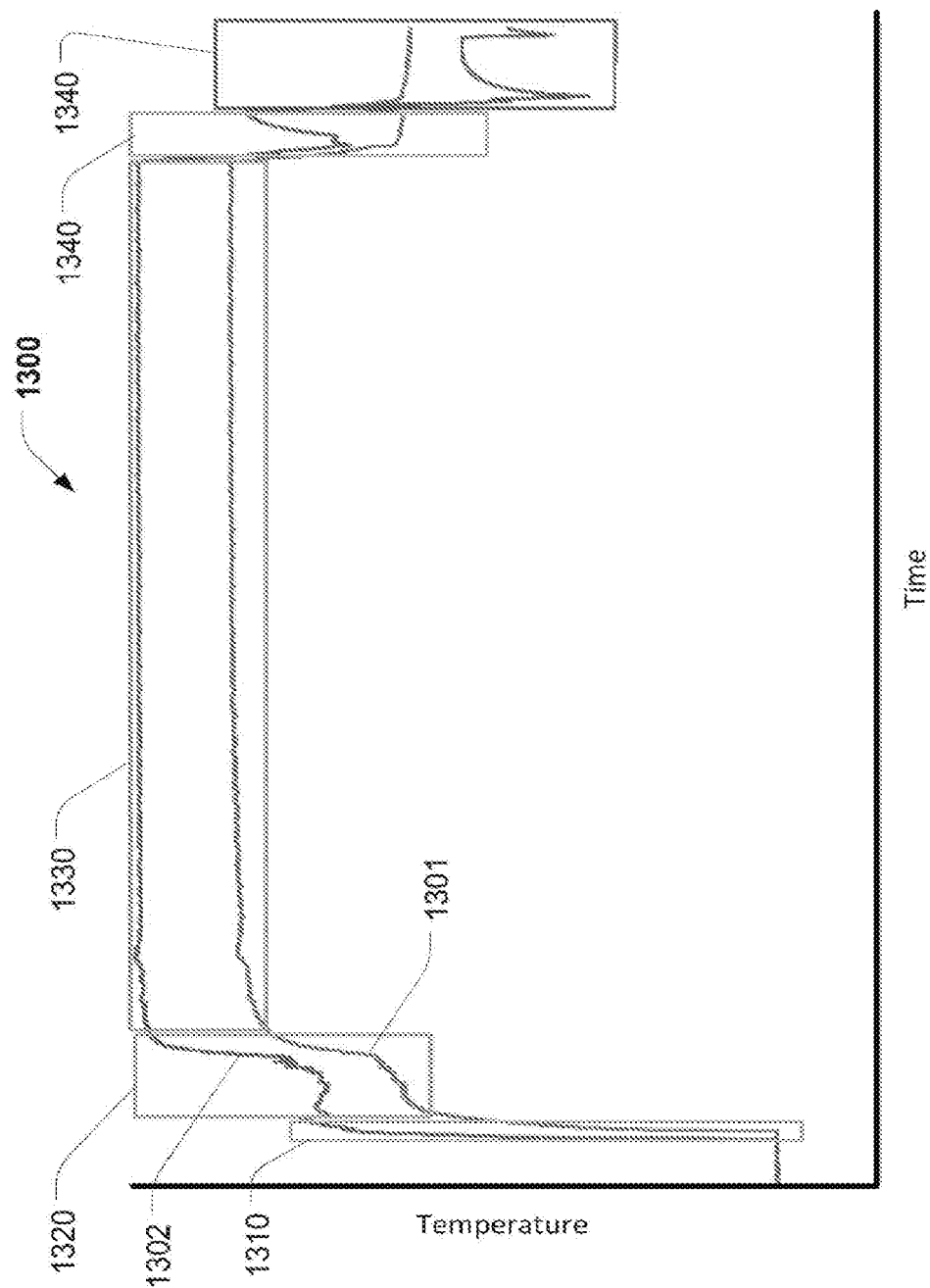
FIG. 19 is a graph depicting control cycles of an embodiment method according to FIG. 17.

FIG. 19 is a graph 1300 that depicts control phases of the method 1100 when used in frothing milk. This figure plots the steam temperature during the milk frothing cycle, recorded at the heater outlet 1301 and before the venturi 1302.

The plot shows transitions from phase 1 (at 1310), phase 2 (at 1320), phase 3 (at 1330), phase 4 (at 1340) and phase 5 (at 1350). It will be further appreciated, by way of example only, that an espresso making machine can comprise a frothing apparatus as taught by any one of the embodiments suggested herein.

It will be appreciated that a temperature sensing assembly for a milk frothing apparatus can include
a temperature sensor element 1022 and a resilient support element 1024 that receives and biases the temperature sensor element 1022 towards thermal communication with the underside of a vessel;
wherein the assembly 1020 is located towards the end of a protruding portion 1021 that extends from the body of the a milk frothing apparatus 1001; and
wherein an upper surface 1023 of the temperature sensor assembly is adapted to promote liquid movement into a drip tray reservoir.

The support may form a seal between protruding portion 1021 and the upper surface defined by a separate element 1023.

The upper surface element 1023 can have an aperture 1027, such that the resilient support element 1024 forms a seal for limiting ingress of fluid through the aperture 1027.

The resilient support element can be held in compression between the protruding portion 1021 of the and the upper surface element 1023 for creating a water tight seal.

The upper surface element 1023 can be coupled to the protruding portion 1021 by one or more press clips 1030 extending from the underside the upper surface element that engage cooperating recesses 1032 in the protruding portion.

A shoulder 1041 of the protruding portion 1021 can support the resilient support element 1024, such that resilient support element is captured and abutting held by the protruding portion 1021 and the upper surface element 1023.

The protruding portion 1021 can have an aperture 1026 for receiving the temperature sensor, which is covered by the resilient support element 1024.

The temperature sensor element 1022 can be retained within the resilient support element 1024, and a U clip 1028 engages both the temperature sensor element 1022 and the resilient support element 1024. The U clip can prevents the temperature sensor element 1022 from being pulled upward, and prevents the temperature sensor element 1022 being deflected too far downward due to it engaging the chassis.

A rib 1029 of the milk frothing apparatus can limit downward deflection of the temperature sensor element 1022.

A sleeve 1042 defined by the protruding portion 1021 can capture the downwardly extending outer wall 1043 of the resilient support element 1024.

A void space 1045 below the resilient support element can allow downward travel of the resilient support element.

The temperature sensor element 1021 can be thermally coupled to the vessel 1050, wherein the temperature sensor element 1021 is further coupled to a processor module 1060 that receives a temperature signal and controls a steam generation module 1070 for generating steam delivered to the vessel.

The milk frothing apparatus can include: a steam source; an air source coupled to an air injector module for mixing the air and steam; a user interface for receiving input from a user; and wherein the apparatus is configurable by receiving input parameters through the user interface, whereby the parameters includes final milk temperature, and an indication of froth amount. The milk frothing apparatus can further comprise any features of embodiment wherewith described.

Interpretation

It will be appreciated that the illustrated embodiments provide an apparatus for milk frothing.

Although the invention has been described with reference to specific examples, it will be appreciated by those skilled in the art that the invention may be embodied in many other forms.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

As used herein, unless otherwise specified the use of terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader, or with reference to the orientation of the structure during nominal use, as appropriate. Similarly, the terms "inwardly" and "outwardly" generally refer to the orientation of a surface relative to its axis of elongation, or axis of rotation, as appropriate.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The invention claimed is:

1. A method of frothing milk with a milk frothing apparatus during a milk frothing cycle, the method including the steps of:
receiving one or more user input parameters including a final desired milk temperature;
heating a heater for a predetermined amount of time to generate steam from a water reservoir;
introducing and mixing air with the steam for a period of time based on at least one of the one or more user input parameters,
wherein an air pump is operated to introduce and mix the air with the steam;
introducing air to the milk based on the at least one of the one or more user input parameters;
disabling operation of the air pump;
determining a temperature offset of the milk to be heated based on the one or more user input parameters;
heating the milk to the determined temperature offset using steam generated by the heater;
maintaining or increasing a power level of the heater for a duration of time to increase a temperature and a pressure of the steam to froth the milk;
reducing the power level of the heater over duration of time once the milk reaches the determined temperature offset;
wherein the power level of the heater is reduced from a first power to a second power to a third power over the duration of time; and
reducing a steam pressure towards an end of the milk frothing cycle and thereby eliminating unwanted bubbles.

2. The method according to claim 1, wherein the heater is a thermal mass heater.

3. The method according to claim 1, wherein the first power is 1500 W, the second power is 900 W, the third power is 300 W and the duration of time is 5 seconds.

4. The method according to claim 1, wherein the one or more user input parameters further include a froth amount and a milk type.

5. The method according to claim 4, wherein the temperature offset is 10° C. less than a final milk temperature.

6. A method of operating a coffee machine having a milk frothing apparatus, the method including the steps of:
receiving user input parameters, including a final milk temperature and a froth amount;
heating a heater for a predetermined amount of time to generate steam from a water reservoir;
introducing and mixing air with the steam for a period of time based on at least one of the user input parameters,
wherein an air pump is operated to introduce and mix the air with the steam;
introducing air to the milk based on the at least one of the user input parameters;
disabling operation of the air pump;
determining a temperature offset of the milk to be heated based on the user input parameters;
heating the milk to the determined temperature offset using steam generated by the heater;
maintaining or increasing a power level of the heater for a duration of time to increase a temperature and a pressure of the steam to froth the milk;
reducing the power level of the heater over a duration of time once the milk reaches the determined temperature offset;
wherein the power level of the heater is reduced from a first power to a second power to a third power over the duration of time;
reducing a steam pressure towards an end of the milk frothing cycle and thereby eliminating unwanted bubbles; and
purging a steam path of the apparatus by pulsing water through the steam path.

7. A method of frothing milk with a milk frothing apparatus, the method including the steps of:
receiving one or more user input parameters including a final desired milk temperature;
heating a heater for a predetermined amount of time to generate steam from a water reservoir;
introducing and mixing air with the steam for a period of time based on at least one of the one or more the user input parameters,
wherein an air pump is operated to introduce and mix the air with the steam;
introducing air to the milk based on the at least one of the one or more user input parameters;
disabling operation of the air pump;
determining a temperature offset of the milk to be heated based on the one or more user input parameters;
heating the milk to the determined temperature offset using steam generated by the heater;
maintaining or increasing a power level of the heater for a duration of time to increase a temperature and a pressure of the steam to froth the milk;
heating the milk to the final desired milk temperature while reducing the power level of the heater over a duration of time once the milk reaches the determined temperature offset for reducing steam pressure for eliminating unwanted bubbles; and
wherein the power level of the heater is reduced from a first power to a second power to a third power over the duration of time.

8. A method of frothing milk with a milk frothing apparatus, the method including the steps of:
receiving one or more user input parameters including a final desired milk temperature;
introducing air to the milk based on at least one of the user input parameters;
determining a temperature offset of the milk to be heated based on the one or more user input parameters;
heating the milk to the determined temperature offset using steam generated by a heater; and
reducing at least one of a power level or a temperature of the heater over a duration of time once the milk reaches the determined temperature offset,
wherein the power level of the heater is reduced from a first power level to a second power level, and wherein the second power level is non-zero.

* * * * *